US012780213B2

(12) United States Patent
Johansson et al.

(10) Patent No.: US 12,780,213 B2
(45) Date of Patent: Nov. 3, 2026

(54) SYSTEMS AND TECHNIQUES FOR CONTROLLING AN ENGINE OF A VEHICLE

(71) Applicant: QUALCOMM Incorporated, San Diego, CA (US)

(72) Inventors: Lars Johansson, Säve (SE); Karl-Johan Ahlgren Ode, Gothenburg (SE)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 18/952,921

(22) Filed: Nov. 19, 2024

(65) Prior Publication Data

US 2026/0138615 A1 May 21, 2026

(51) Int. Cl.

*B60W 30/192* (2012.01)
*B60W 50/00* (2006.01)
*F02N 11/08* (2006.01)
*H04W 4/40* (2018.01)

(52) U.S. Cl.

CPC ...... *B60W 30/192* (2013.01); *B60W 50/0097* (2013.01); *F02N 11/0814* (2013.01); *B60W 2520/04* (2013.01); *B60W 2540/10* (2013.01); *B60W 2540/12* (2013.01); *B60W 2554/4041* (2020.02); *B60W 2554/4045* (2020.02); *B60W 2556/40* (2020.02); *B60W 2556/65* (2020.02); *B60W 2710/06* (2013.01); *H04W 4/40* (2018.02)

(58) Field of Classification Search

CPC ........... B60W 30/192; B60W 50/0097; B60W 2520/04; B60W 2540/10; B60W 2540/12; B60W 2554/4041; B60W 2554/4045; B60W 2556/40; B60W 2556/65; B60W 2710/06; H04W 4/40; F02N 11/0814; F02N 11/0818

See application file for complete search history.

(56) References Cited

U.S. PATENT DOCUMENTS

| | | | | |
|---|---|---|---|---|
| 9,145,864 | B2 * | 9/2015 | Kristinsson | F02N 11/0837 |
| 9,556,808 | B2 * | 1/2017 | Yoo | F02D 33/006 |
| 9,951,739 | B2 * | 4/2018 | Huber | F02D 29/02 |
| 11,440,532 | B2 * | 9/2022 | Ortmann | F02D 41/042 |
| 11,639,692 | B2 * | 5/2023 | Kudo | F02N 11/0837 123/339.14 |

(Continued)

*Primary Examiner* — Sizo B Vilakazi
(74) *Attorney, Agent, or Firm* — Polsinelli

(57) ABSTRACT

Systems and techniques are described herein for controlling an engine of a vehicle. For instance, a method for controlling an engine of a vehicle is provided. The method may include predicting a time associated with acceleration of the vehicle; determining an engine-off duration based on an engine-shutdown duration, an engine-startup duration, and the time wherein the engine-shutdown duration is associated with shutting down the engine, wherein the engine-startup duration is associated with starting the engine, and wherein the engine-off duration comprises a prediction of how long the engine will be shutdown based on the predicted time; and based on the engine-off duration being less than an engine-off threshold, preventing an idle-engine shutdown feature from stopping the engine of the vehicle, wherein the idle-engine shutdown feature is configured to shut down the engine when the vehicle is stopped.

20 Claims, 14 Drawing Sheets

(56) References Cited

U.S. PATENT DOCUMENTS

| | | | | |
|---|---|---|---|---|
| 2013/0332054 | A1* | 12/2013 | Kristinsson | F02N 11/0837<br>701/113 |
| 2018/0258897 | A1* | 9/2018 | Leone | F02N 11/0851 |
| 2020/0123995 | A1* | 4/2020 | Vadlamani | F02N 11/0837 |
| 2022/0307431 | A1* | 9/2022 | Kudo | F02N 11/0837 |

* cited by examiner

SYSTEMS AND TECHNIQUES FOR CONTROLLING AN ENGINE OF A VEHICLE

TECHNICAL FIELD

The present disclosure generally relates to controlling an engine of a vehicle. For example, aspects of the present disclosure include systems and techniques for controlling an engine of a vehicle.

BACKGROUND

Some vehicles are equipped with an idle-engine shutdown feature. The idle-engine shutdown feature may reduce idle time in combustion engines, thereby reducing emissions. For example, the idle-engine shutdown feature may shutdown an engine of a vehicle when the vehicle is stopped. Additionally, the idle-engine shutdown feature may restart the engine when a driver releases a brake pedal.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for controlling an engine of a vehicle. According to at least one example, a method is provided for controlling an engine of a vehicle. The method includes: predicting a time associated with acceleration of the vehicle; determining an engine-off duration based on an engine-shutdown duration, an engine-startup duration, and the time wherein the engine-shutdown duration is associated with shutting down the engine, wherein the engine-startup duration is associated with starting the engine, and wherein the engine-off duration comprises a prediction of how long the engine will be shutdown based on the predicted time; and based on the engine-off duration being less than an engine-off threshold, preventing an idle-engine shutdown feature from stopping the engine of the vehicle, wherein the idle-engine shutdown feature is configured to shut down the engine when the vehicle is stopped.

In another example, an apparatus for controlling an engine of a vehicle is provided that includes at least one memory and at least one processor (e.g., configured in circuitry) coupled to the at least one memory. The at least one processor configured to: predict a time associated with acceleration of the vehicle; determine an engine-off duration based on an engine-shutdown duration, an engine-startup duration, and the time wherein the engine-shutdown duration is associated with shutting down the engine, wherein the engine-startup duration is associated with starting the engine, and wherein the engine-off duration comprises a prediction of how long the engine will be shutdown based on the predicted time; and based on the engine-off duration being less than an engine-off threshold, prevent an idle-engine shutdown feature from stopping the engine of the vehicle, wherein the idle-engine shutdown feature is configured to shut down the engine when the vehicle is stopped.

In another example, a non-transitory computer-readable medium is provided that has stored thereon instructions that, when executed by one or more processors, cause the one or more processors to: predict a time associated with acceleration of the vehicle; determine an engine-off duration based on an engine-shutdown duration, an engine-startup duration, and the time wherein the engine-shutdown duration is associated with shutting down the engine, wherein the engine-startup duration is associated with starting the engine, and wherein the engine-off duration comprises a prediction of how long the engine will be shutdown based on the predicted time; and based on the engine-off duration being less than an engine-off threshold, prevent an idle-engine shutdown feature from stopping the engine of the vehicle, wherein the idle-engine shutdown feature is configured to shut down the engine when the vehicle is stopped.

In another example, an apparatus for controlling an engine of a vehicle is provided. The apparatus includes: means for predicting a time associated with acceleration of the vehicle; means for determining an engine-off duration based on an engine-shutdown duration, an engine-startup duration, and the time wherein the engine-shutdown duration is associated with shutting down the engine, wherein the engine-startup duration is associated with starting the engine, and wherein the engine-off duration comprises a prediction of how long the engine will be shutdown based on the predicted time; and means for based on the engine-off duration being less than an engine-off threshold, preventing an idle-engine shutdown feature from stopping the engine of the vehicle, wherein the idle-engine shutdown feature is configured to shut down the engine when the vehicle is stopped.

In another example, a method is provided for controlling an engine of a vehicle. The method includes: predicting a time associated with acceleration of the vehicle based on at least one of sensor data captured by one or more sensors of the vehicle, a vehicle-to-everything (V2X) message received by the vehicle, a map of an environment of the vehicle, a catalog of predefined situations, or tracked objects in a zone of interest; and starting the engine of the vehicle based on the time.

In another example, an apparatus for controlling an engine of a vehicle is provided that includes at least one memory and at least one processor (e.g., configured in circuitry) coupled to the at least one memory. The at least one processor configured to: predict a time associated with acceleration of the vehicle based on at least one of sensor data captured by one or more sensors of the vehicle, a vehicle-to-everything (V2X) message received by the vehicle, a map of an environment of the vehicle, a catalog of predefined situations, or tracked objects in a zone of interest; and start the engine of the vehicle based on the time.

In another example, a non-transitory computer-readable medium is provided that has stored thereon instructions that, when executed by one or more processors, cause the one or more processors to: predict a time associated with acceleration of the vehicle based on at least one of sensor data captured by one or more sensors of the vehicle, a vehicle-to-everything (V2X) message received by the vehicle, a map of an environment of the vehicle, a catalog of predefined situations, or tracked objects in a zone of interest; and start the engine of the vehicle based on the time.

In another example, an apparatus for controlling an engine of a vehicle is provided. The apparatus includes: means for predicting a time associated with acceleration of the vehicle based on at least one of sensor data captured by one or more sensors of the vehicle, a vehicle-to-everything (V2X) message received by the vehicle, a map of an environment of the vehicle, a catalog of predefined situations, or tracked objects in a zone of interest; and means for starting the engine of the vehicle based on the time.

In some aspects, one or more of the apparatuses described herein is, can be part of, or can include an extended reality device (e.g., a virtual reality (VR) device, an augmented reality (AR) device, or a mixed reality (MR) device), a vehicle (or a computing device, system, or component of a vehicle), a mobile device (e.g., a mobile telephone or so-called "smart phone", a tablet computer, or other type of mobile device), a smart or connected device (e.g., an Internet-of-Things (IoT) device), a wearable device, a personal computer, a laptop computer, a video server, a television (e.g., a network-connected television), a robotics device or system, or other device. In some aspects, each apparatus can include an image sensor (e.g., a camera) or multiple image sensors (e.g., multiple cameras) for capturing one or more images. In some aspects, each apparatus can include one or more displays for displaying one or more images, notifications, and/or other displayable data. In some aspects, each apparatus can include one or more speakers, one or more light-emitting devices, and/or one or more microphones. In some aspects, each apparatus can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
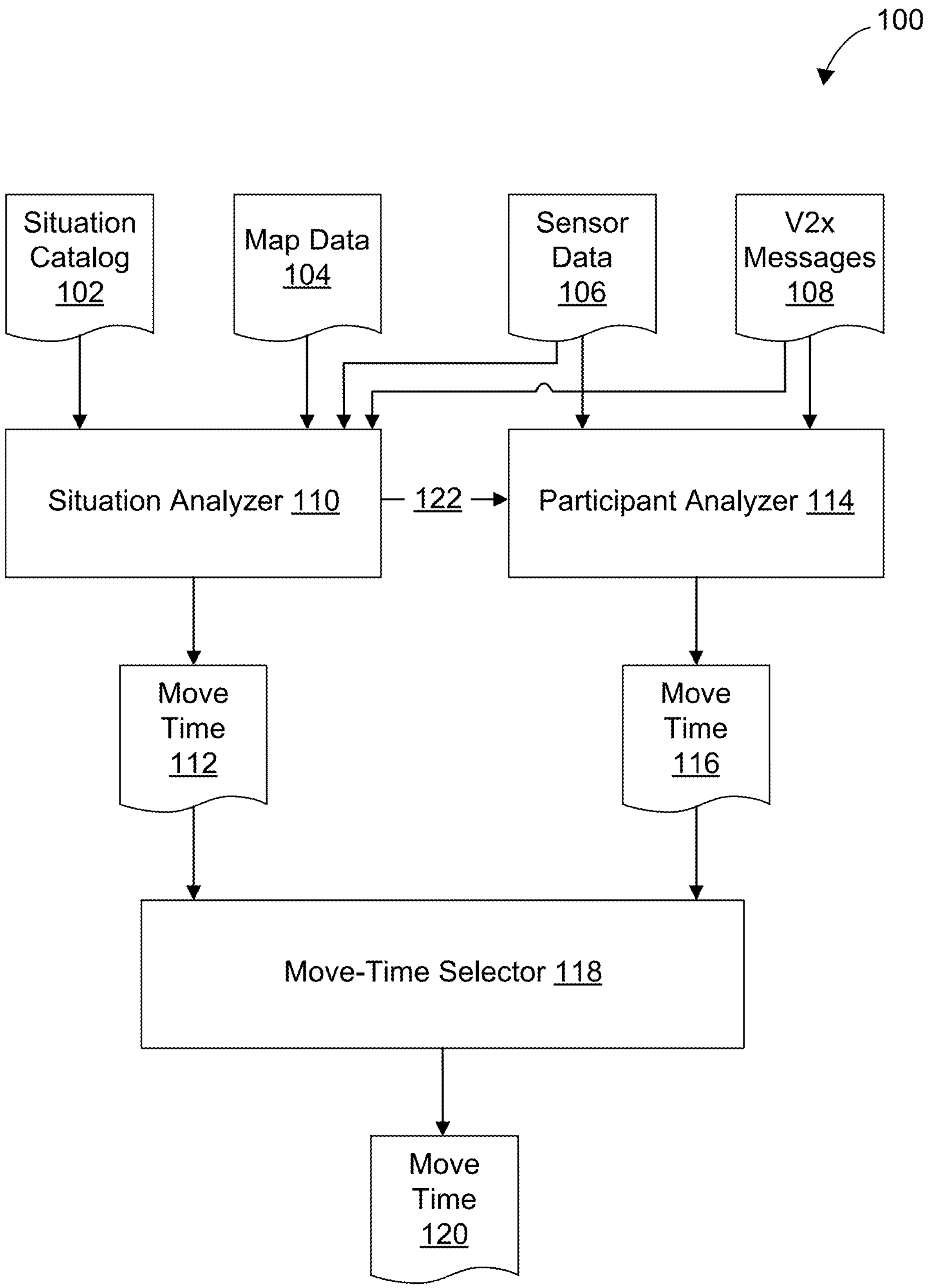
FIG. 1 is a block diagram illustrating an example system for determining a time associated with acceleration of a vehicle (e.g., a "move time"), according to various aspects of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

As described above, some vehicles are equipped with an idle-engine shutdown feature. The idle-engine shutdown feature may reduce idle time in combustion engines, thereby reducing emissions. For example, the idle-engine shutdown feature may shutdown an engine of a vehicle when the vehicle is stopped. Additionally, the idle-engine shutdown feature may restart the engine when a driver releases a brake pedal. An idle-engine shutdown feature may be referred to, in the field as: start-stop, auto start-stop, engine start-stop, automatic engine shutdown, idle stop, auto idle stop, engine idle shutdown, etc.

However, shutting down an engine for short stops (e.g., stops of 5 seconds or less) may be undesirable because short stops may not contribute to a net negative fuel emissions. For example, it may not conserve net negative fuel emissions to stop and restart an engine within the duration of a short stop. Additionally, each engine shutdown causes additional wear and tear on vehicle components which therefore need to be selected with higher quality and cost. Further, engine shutdowns that appear unnecessary can result in negative driver perception of the idle-engine shutdown feature. Drivers with a negative perception of an idle-engine shutdown feature may elect to disable the idle-engine shutdown feature.

Additionally, under certain circumstances an engine shutdown because a vehicle stops may be undesirable for safety reasons. For example, if a vehicle stop in the middle of an intersection or on a railroad track, it may be unsafe to shut down the engine. Additionally or alternatively, it may be undesirable to shut down an engine of a vehicle when the vehicle stops if a battery of the vehicle is low, or if it is desirable to keep combustion engine running to enable other systems (such as climate control for cooling or heating).

Some example situations in which a vehicle may be stopped, yet a driver may want the vehicle will quickly start moving again (so engine should be kept running) include: when a vehicle comes to stop at a crosswalk where a pedestrian is just about to exit from the road zone, when a vehicle comes to a stop as the second vehicle at a traffic light which has just turned green, but before the vehicle in front has started moving, when a vehicle comes to stop in an intersection, train crossing, no-stop zone etc. and/or when a vehicle comes to stop with emergency vehicle close by.

Some example situations in which a vehicle is stopped and the engine is shutdown (e.g., based on actions of an idle-engine shutdown feature), and the driver may want the vehicle to start to move soon include: when a lead vehicle starts to move and/or a brake light of the lead vehicle switches off and/or when a vehicle is stopped as the first vehicle at traffic light and the traffic light turns green. Additionally driver behavior, such as attention and gaze direction, may indicate that drivers wants to drive away (for example due to driver anticipating an opening in cross traffic).

Various aspects relate generally to for controlling an engine of a vehicle. Some aspects more specifically relate to preventing an engine of a vehicle from shutting down. In some examples, the systems and techniques described herein may predict a time associated with acceleration of the vehicle (e.g., a time at which a driver may want to accelerate) and prevent an idle-engine shutdown feature from shutting down an engine of a vehicle based on the predicted time being too soon after the current time.

Particular aspects of the subject matter described in this disclosure can be implemented to realize one or more of the following potential advantages. In some examples, by preventing an engine from shutting down when engine is likely to restart too soon after the engine is shut down, fuel consumption may be improved compared to a default implementation of an idle-engine shutdown feature. Additionally or alternatively, preventing an engine from shutting down when engine is likely to restart too soon after the engine is shut down may decrease wear and tear on a vehicle. Additionally, reducing wear and tear may may allow for improved flexibility in component selection (which may result in potential cost savings in production and/or in maintenance). Additionally or alternatively, preventing an engine from shutting down when engine is likely to restart too soon after the engine is shut down may result in higher customer satisfaction.

Other aspects relate to starting an engine of a vehicle. In some examples, the systems and techniques may determine to restart an engine based on a determined move time. For example, an idle-engine shutdown feature may shut down an engine of a vehicle. The systems and techniques may determine a move time. Additionally, the systems and techniques may obtain or determine an engine-startup duration. The systems and techniques may determine to start the engine based on the move time and the engine-startup duration. For example, the systems and techniques may start the engine the engine-startup duration before the move time (e.g., at t=move time−engine startup duration). In this way, the systems and techniques may cause the engine to be running at the move time (e.g., the time predicted when the driver may want to accelerate).

Particular aspects of the subject matter described in this disclosure can be implemented to realize one or more of the following potential advantages. In some examples, by restarting an engine based on a predicted move time, the described techniques can be used to improve driver satisfaction by having the engine running when the driver is likely ready to accelerate.

Systems, apparatuses, methods (also referred to as processes), and computer-readable media (collectively referred to herein as "systems and techniques") are described herein for controlling an engine of a vehicle. For example, the systems and techniques described herein may predict a time associated with acceleration of the vehicle (e.g., a time at which a driver may want to accelerate) and prevent an idle-engine shutdown feature from shutting down an engine of a vehicle based on the predicted time being too soon after the current time.

For example, the systems and techniques may determine or obtain an engine-shutdown duration which may describe how much time it takes for an engine of the vehicle to shut down. Additionally, the systems and techniques may determine or obtain an engine-startup duration which may describe how much time it takes for the engine to startup. The engine-shutdown duration and/or the engine-startup duration may be based on properties of the vehicle (such as a crank speed of a turner motor). In some aspects, the systems and techniques may determine the engine-shutdown duration and/or the engine-startup duration based on factors such as temperature of the engine, temperature of the environment, and/or fuel level of the vehicle. In other aspects, the engine-shutdown duration and/or the engine-startup duration may be constant. Additionally or alternatively, the systems and techniques may determine the engine-shutdown duration and/or the engine-startup duration, for example, by timing engine shutdowns and/or engine restarts and storing a rolling average of the timings as the engine-shutdown duration and/or engine-startup duration.

The systems and techniques may predict the time associated with acceleration of the vehicle (which may be referred to herein as a "move time") based on factors such as contextual cues from the environment of the vehicle (e.g., as observed by sensors of the vehicle), message from other vehicles, traffic lights, or roadside units (RSUs), a map of the environment, a catalog of predefined situations, and/or tracked objects in a zone of interest of the vehicle. For example, the systems and techniques may determine (e.g., based on sensor data, a map of the environment, and a catalog of predefined situations) that the vehicle is about to stop as the first vehicle at a traffic light and the traffic light will turn green in two seconds.

As the vehicle slows to a stop, as the vehicle stops moving, and/or just after the vehicle has stopped moving and before an idle-engine shutdown feature has shut down the engine of the vehicle, the systems and techniques may determine an engine-off duration. The engine-off duration may describe how long the engine will remain off based on the move time, the engine-shutdown duration, and the engine-startup duration. For example, the engine-off duration may be based on the current time, the move time, the engine-shutdown duration, and the engine-startup duration. For example, the engine-off duration may be the difference between the current time and the move time less the engine-shutdown duration and the engine-startup duration. For example, the engine-off duration may be expressed as:

engine-off duration=move time−current time−engine-shutdown duration−engine-startup duration For example, if it takes 1 second to shut down an engine (e.g., engine-shutdown duration=1 second) and it takes 1 second to restart the engine, (e.g., engine-startup duration=1 second), and the systems and techniques predict the driver will want to accelerate in 5 seconds, the engine-off duration would be 3 seconds.

The systems and techniques may determine whether to keep the engine running (e.g., to prevent the idle-engine shutdown feature from shutting down the engine) based on whether the engine-off duration exceeds a threshold. The threshold may be based on factors such as, fuel economy (e.g., a comparison of fuel consumed by shutting down and restarting the engine versus fuel consumed by keeping the engine running), minimizing, reducing, or preventing driver irritation, and/or an operational mode of the vehicle (e.g., a fuel-efficiency mode or a sport mode). For example, the systems and techniques may determine or obtain information indicating that if an engine is shutoff and restarted in less than 5 seconds, more fuel is consumed in restarting the engine than the amount of fuel that is conserved while the engine is off. In some aspects, the systems and techniques may determine the threshold based on factors such as temperature of the engine, temperature of the environment, and/or fuel level of the vehicle. In other aspects, the threshold may be constant.

The systems and techniques may determine to keep the engine running (e.g., to prevent the idle-engine shutdown feature from shutting down the engine) if the engine-off duration does not exceed the threshold. Additionally, the systems and techniques may determine to allow the idle-engine shutdown feature to shut the engine down if the engine-off duration exceeds the threshold.

For example, the systems and techniques may operate according to:

if engine-off duration>threshold→engine shutdown if engine-off duration<threshold→prevent engine shutdown Additionally or alternatively, the systems and techniques may determine to restart an engine based on a determined move time. For example, an idle-engine shutdown feature may shut down an engine of a vehicle. The systems and techniques may determine a move time as described above (e.g., based on sensor data, V2X messages, a map of the environment, and/or a catalog of predetermined situations). Additionally, the systems and techniques may obtain or determine an engine-startup duration. The systems and techniques may determine to start the engine based on the move time and the engine-startup duration. For example, the systems and techniques may start the engine the engine-startup duration before the move time. In this way, the systems and techniques may cause the engine to be running at the move time (e.g., the time predicted when the driver may want to accelerate).

The systems and techniques may provide improved fuel consumption compared to a default implementation of an idle-engine shutdown feature. Fuel consumption could be measured relative to the default implementation of an idle-engine shutdown feature. Additionally or alternatively, the systems and techniques may allow for improved flexibility in component selection (which may result in potential cost savings in production and/or in maintenance). Additionally or alternatively, the systems and techniques may result in higher customer satisfaction.

Various aspects of the application will be described with respect to the figures below.

FIG. 1 is a block diagram illustrating an example system 100 for determining a time associated with acceleration of a vehicle (e.g., a "move time"), according to various aspects of the present disclosure. The move time may be an estimate of when the traffic situation itself, or the traffic situation in combination with other traffic participants, would permit a vehicle to move (e.g., when a driver of the vehicle may resume driving).

In general, a situation analyzer 110 of system 100 may process a situation catalog 102, a map data 104, sensor data 106, and vehicle-to-everything (V2X) messages 108 to generate a move time 112 and contextual data 122. Additionally or alternatively, a participant analyzer 114 may process sensor data 106, V2X messages 108, and contextual data 122 to generate a move time 116. A move-time selector 118 may determine move time 120 based on move time 112 and/or move time 116.

Situation catalog 102 may be, or may include, data describing various predetermined situations that a vehicle may be in. For example, situation catalog 102 may include descriptions of a vehicle being stopped (or stopping) proximate to a pedestrian crossing, a crosswalk, zebra crossings without lights, zebra crossing with lights, inside intersection, outside intersection with traffic lights, at train tracks, etc. In some aspects, situation catalog 102 may be, or may include, a list of predefined situations and/or conditions or set of semantic maps including examples of situations and/or rules describing the situations. The list, conditions, maps and/or rules may, or may not, represent specific locations but may represent general situations (e.g., the situation of a vehicle being stopped at an intersection or the circumstance of being stopped in an intersection).

Map data 104 may be, or may include, a map of an environment of the vehicle. In some aspects, map data 104 may be, or may include, three-dimensional (3D) map data including points in a 3D space. Map data 104 may include semantic information about type of road, or features in the environment such as zebra crossing, intersection, railroad tracks, lane boundaries, lane markers, traffic lights, traffic signs etc.

In some aspects, map data 104 may be, or may include, a high-definition (HD) map. In the context of HD maps, the term "high" typically refers to the level of detail and accuracy of the map data. In some cases, an HD map may have a higher spatial resolution and/or level of detail as compared to a non-HD map. While there is no specific universally accepted quantitative threshold to define "high" in HD maps, several factors contribute to the characterization of the quality and level of detail of an HD map. Some key aspects considered in evaluating the "high" quality of an HD map include resolution, geometric accuracy, semantic information, dynamic data, and coverage. With regard to resolution, HD maps generally have a high spatial resolution, meaning they provide detailed information about the environment. The resolution can be measured in terms of meters per pixel or pixels per meter, indicating the level of detail captured in the map. With regard to geometric accuracy, an accurate representation of road geometry, lane boundaries, and other features can be important in an HD map. High-quality HD maps strive for precise alignment and positioning of objects in the real world. Geometric accuracy is often quantified using metrics such as root mean square error (RMSE) or positional accuracy. With regard to semantic information, HD maps include not only geometric data but also semantic information about the environment. This may include lane-level information, traffic signs, traffic signals, road markings, building footprints, and more. The richness and completeness of the semantic information contribute to the level of detail in the map. With regard to dynamic data, some HD maps incorporate real-time or near real-time updates to capture dynamic elements such as traffic flow, road closures, construction zones, and temporary changes. The frequency and accuracy of dynamic updates can affect the quality of the HD map. With regard to coverage, the extent of coverage provided by an HD map is another important factor. Coverage refers to the geographical area covered by the map. An HD map can cover a significant portion of a city, region, or country. In general, an HD map may exhibit a rich level of detail, accurate representation of the environment, and extensive coverage.

Sensor data 106 may include image data (e.g., from one or more cameras positioned on the vehicle and directed toward the environment of the vehicle). Additionally or alternatively, sensor data 106 may include data (e.g., point clouds) from a light detection and ranging (LIDAR) system and/or a radio detection and ranging (RADAR) system.

V2X messages 108 may include messages from other vehicles in the environment, traffic lights in the environment, road-side units (RSUs) in the environment (such as traffic cameras), etc. V2X messages 108 may describe the situation in the environment. For example, V2X messages 108 may include indications of pedestrians and/or vehicles in the environment.

Situation analyzer 110 may determine move time 112 based on a situation of the vehicle that implements system 100. For example, situation analyzer 110 may classify a situation of the vehicle as the vehicle slows to a stop, as the vehicle stops, and/or just after the vehicle stops. Situation analyzer 110 may classify the situation based on situation catalog 102, map data 104, sensor data 106, and/or V2X messages 108. The situation of the vehicle may be classified into classes such as: waiting at a crosswalk, waiting at an intersection, first car waiting at a red light, second car waiting at a red light, nth car waiting at a red light, waiting at a train crossing, stopped in an intersection, stopped on a train crossing, etc. In some cases, multiple traffic situations could be applicable at once for example, a vehicle could be both at a zebra crossing and at a T-intersection. Situation analyzer 110 may determine move time 112 based on the classification of the situation of the vehicle.

In addition to generating move time 112, in some aspects, situation analyzer 110 may generate contextual data 122 based on situation catalog 102, map data 104, sensor data 106, and V2X messages 108. Contextual data 122 may include contextual/situation information determined by situation analyzer 110. In some aspects, contextual data 122 may include data from situation catalog 102 based on a situation determined by situation analyzer 110 (e.g., a situation from situation catalog 102 that matches a current situation of the vehicle).

Participant analyzer 114 may determine move time 116 based on objects (e.g., people, animals, vehicles, etc.) in the environment of the vehicle that implements system 100. For example, participant analyzer 114 may detect and track objects in the environment based on sensor data 106. For instance, participant analyzer 114 may include an object detection and/or object tracking algorithm. Additionally or alternatively, participant analyzer 114 may track objects based on V2X messages 108. For example, V2X messages 108 may include position data (e.g., broadcast by another vehicle). Participant analyzer 114 may track the other vehicle based on the position data. Additionally or alternatively, V2X messages 108 may include images from a camera (e.g., a traffic camera). participant analyzer 114 may track pedestrians, cyclists, vehicles, etc. based on images received from the camera. As another example, an RSU (e.g., a traffic camera) may detect and track objects and V2X messages 108 may include positions of tracked objects. In some aspects, participant analyzer 114 may use cues (such as brake lights, hazard lights, turn signals, hand signals, gaze direction, etc.) to track objects (e.g., vehicles, cyclists, pedestrians). Participant analyzer 114 may determine move time 116 based on the tracked objects.

Additionally or alternatively, participant analyzer 114 may analyze objects based on contextual data 122. For example, participant analyzer 114 may analyze pedestrians that are in a zebra crossing differently that pedestrians that are not in a zebra crossing. As another example, participant analyzer 114 may analyze people on the side of the road at a crosswalk or intersection differently than people on the side of residential road or people on the side of a highway.

In some aspects, participant analyzer 114 may determine a zone of interest. Participant analyzer 114 may determine move time 116 based on objects in the zone of interest. For example, participant analyzer 114 may predict a time that a traffic participant will leave the zone using object tracking and path prediction (e.g., a pedestrian is walking across a zebra crossing without traffic lights). Participant analyzer 114 may determine move time 116 based on the time that the traffic participant will leave the zone of interest.

Move-time selector 118 may determine move time 120 based on move time 112 and move time 116. In some aspects, move-time selector 118 may select the greater of move time 112 and move time 116. For example, when the slowest of three identified and tracked pedestrians is estimated to have left the zone of interest. Alternatively, move-time selector 118 may set move time 120 to 0 (e.g., indicating an immediate intent to move the vehicle) if a situation-dependent estimate indicates the vehicle should immediately move, (e.g., the vehicle is held up on a train track).

Move-time selector 118 may use traffic-situation information (e.g., move time 112 determined by situation analyzer 110) and participant information (e.g., move time 116 determined by participant analyzer 114) to determine move time 120. For example, the properties of the traffic situation itself may be used to estimate that the driver will want to move immediately. For example, if the vehicle is stopped in the middle of an intersection or stopped on tracks at train crossing, situation analyzer 110 may determine move time 112 to indicate that the move time is immediately.

As another example, the properties of the traffic situation and the involved traffic participants may be used to estimate when driver will want to move. For example, participant analyzer 114 may determine move time 116 based on the vehicle being stopped at traffic light which changes to green, and/or the vehicle being stopped at a traffic light behind a lead vehicle which turns off brake indicators.

In some aspects, system 100 may include rule-based algorithms. For example, situation analyzer 110, participant analyzer 114, and/or move-time selector 118 may be, or may include, respective rule-based algorithms.

Additionally or alternatively, system 100 may include one or more machine-learning models. For example, situation analyzer 110, participant analyzer 114 and/or move-time selector 118 may be, or may include, respective machine-learning models. For example, situation analyzer 110 may be, or may include, a machine-learning model trained to generate move times based on a situation catalog, map data, sensor data, and/or V2X messages, or any combination thereof. Similarly, participant analyzer 114 may be, or may include, a machine-learning model trained to generate move times based on sensor data and/or V2X messages.

For instance, situation analyzer 110 may be trained through an iterative supervised learning process. For example, situation analyzer 110 may process training input data (including, a training situation catalog, training map data, training sensor data, and training V2X messages) to generate a provisional move time. The provisional move time may be compared with a ground-truth move time corresponding to the training input data. An error (or loss) may be calculated based on a difference between the provisional move time and the ground-truth move time. Parameters (e.g., weights or biases) of situation analyzer 110 may be adjusted based on the error such that in further iterations of the training process, situation analyzer 110 will produce move times that are closer to ground-truth move times according to a gradient-descent technique.

Similarly, participant analyzer 114 may be trained through an iterative supervised learning process. For example, participant analyzer 114 may process training input data (including training sensor data and training V2X messages) to generate a provisional move time. The provisional move time may be compared with a ground-truth move time corresponding to the training input data. An error (or loss) may be calculated based on a difference between the provisional move time and the ground-truth move time. Parameters (e.g., weights or biases) of participant analyzer 114 may be adjusted based on the error such that in further iterations of the training process, participant analyzer 114 will produce move times that are closer to ground-truth move times according to a gradient-descent technique.

In some aspects, system 100 may use a hybrid rule-based and a machine-learning-model approach. For example, in some aspects, situation analyzer 110 may be, or may include, a machine-learning model and participant analyzer 114 may be, or may include, rule-based algorithms. As another example, situation analyzer 110 and participant analyzer 114 may include respective machine-learning models and move-time selector 118 may be, or may include, a rule-based algorithm.

Figure 2:
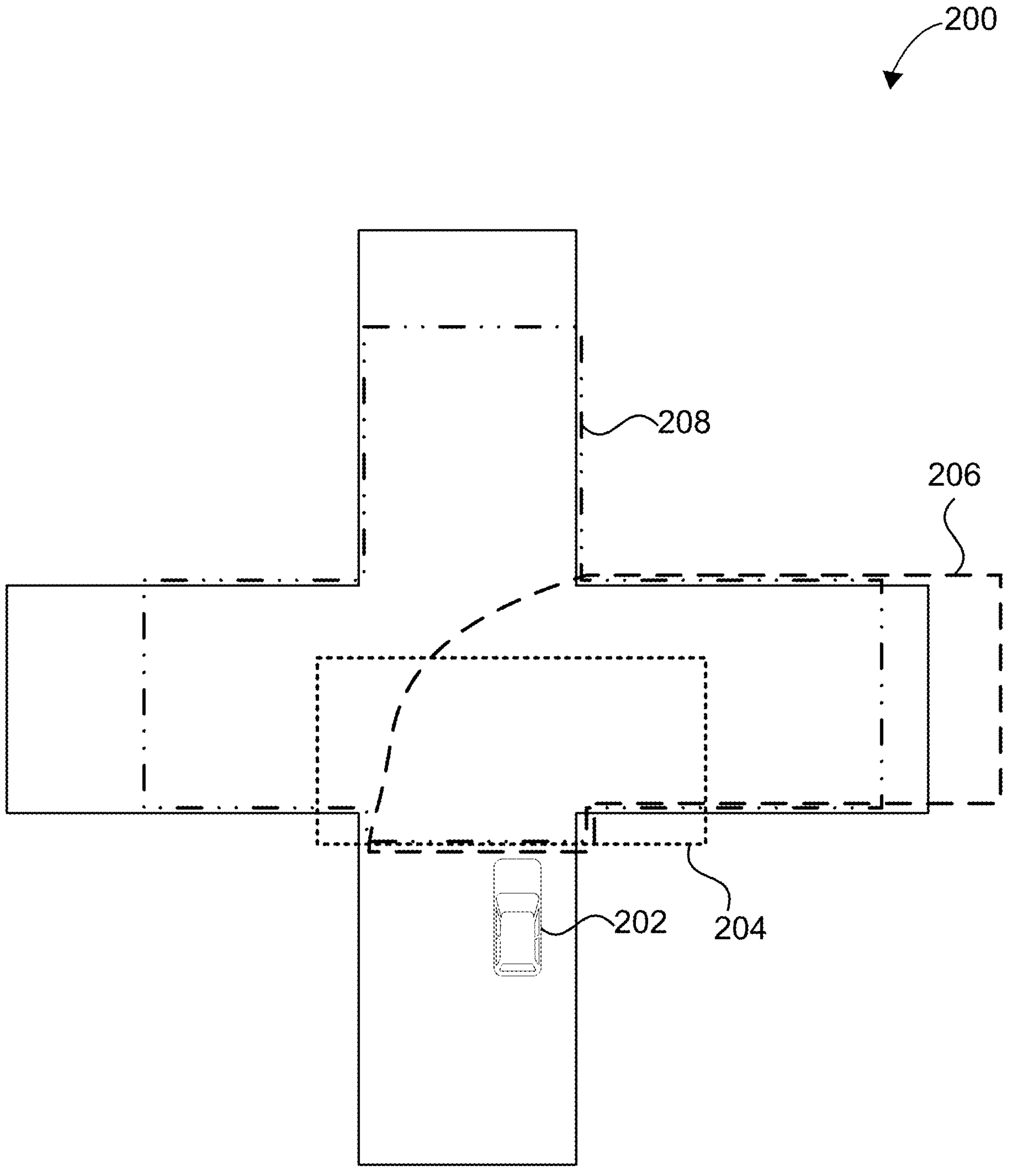
FIG. 2 is a diagram illustrating an example environment including several example zones of interest of a vehicle, according to various aspects of the present disclosure.

FIG. 2 is a diagram illustrating an example environment 200 including several example zones of interest of a vehicle 202, according to various aspects of the present disclosure. For example, vehicle 202 (e.g., a participant analyzer 114 of vehicle 202) may determine a zone of interest to define an area that needs to be clear before vehicle 202 can move. Participant analyzer 114 may determine move time 116 based on a predicted time that a zone of interest will be clear (e.g., based on no tracked objects being within the zone of interest).

Vehicle 202 may determine to use a zone of interest based on factors such as, a route of vehicle 202, a map of environment 200, environment 200 (e.g., whether environment 200 is classified as urban or rural), objects in environment 200, etc. For example, in some aspects, vehicle 202 may determine to use zone of interest 204 (e.g., a predefined geometry, such as a rectangle or trapezoid, in front of vehicle 202). Vehicle 202 may determine zone of interest 204 based on vehicle 202 not having information about a predefined route and/or based on environment 200 including more than a threshold number of objects.

As another example, vehicle 202 may determine to use zone of interest 208 (e.g., custom geometry, based on the specific size and boundaries of the identified traffic situation) based on vehicle 202 not having information about a redefined route.

As yet another example, vehicle 202 may determine to use zone of interest 206, which may be a further refined geometry (e.g., Further refined based on zone of interest 208) where only parts of the traffic situation is considered). Vehicle 202 may determine to use zone of interest 206 based on the planned path of vehicle 202 (e.g., known through planned route of navigation system, ADAS path planning, the position of environment 200 such as positioned in turn-only lane, and/or turn indicator status.

Figure 3:
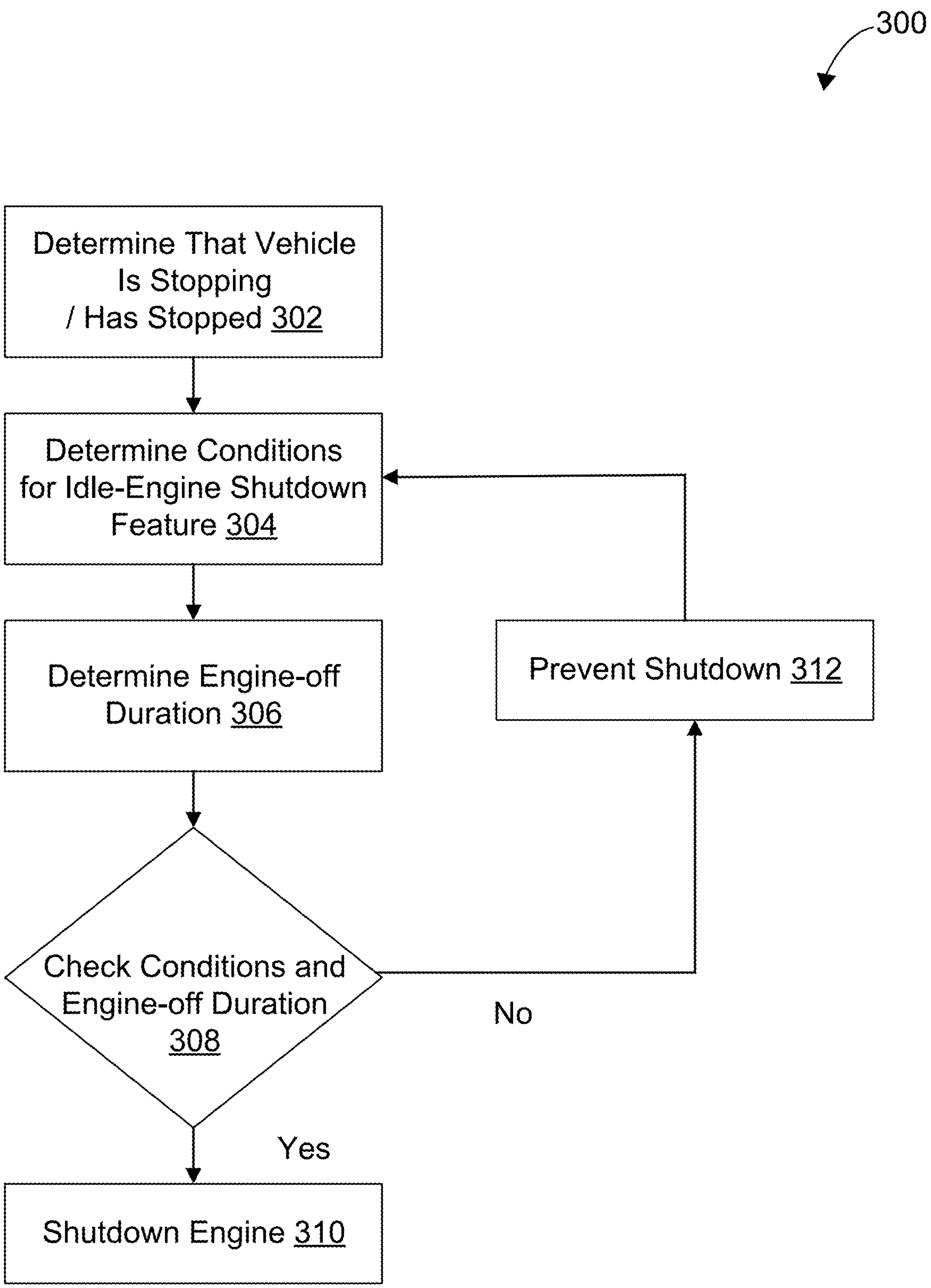
FIG. 3 includes an example flowchart illustrating a process for controlling an engine, according to various aspects of the present disclosure.

FIG. 3 includes an example flowchart illustrating a process 300 for controlling an engine, according to various aspects of the present disclosure. A computing system of a vehicle may implement process 300 to determine, when a vehicle is stopped, whether to shut an engine down (based on an idle-engine shutdown feature) or to leave the engine running.

At block 302, it may be determined that a vehicle implementing process 300 is stopping or has stopped. For example, a velocity of the vehicle may be monitored, and it may be determined that the vehicle is stopping or that the vehicle has stopped.

At block 304, conditions for an idle-engine shutdown feature may be determined. For example, the idle-engine shutdown feature may have conditions that are checked before an engine is shutdown according to the idle-engine shutdown feature. For example, the idle-engine shutdown feature may determine not to shut down an engine, even if the vehicle is stopped if a battery is low, if a heater is running and the temperature in the vehicle is below a threshold, and/or if an air conditioner (AC) is running and the temperature in the vehicle is above a threshold. At block 304, it may be determined whether the conditions of the idle-engine shutdown feature are satisfied.

At block 306, an engine-off duration may be determined. The engine-off duration may be determined based on an engine-shutdown duration, an engine-startup duration, and a move time. For example, the engine-off duration may be determined according to:

$$\text{engine-off duration} = \text{move time} - \text{current time} - \text{engine-shutdown duration} - \text{engine-startup duration}.$$

The engine-shutdown duration and/or the engine-startup duration may be predetermined based on the vehicle. In some aspects, the engine-shutdown duration and/or the engine-startup duration may be determined based on factors such as vehicle temperature, environment temperature, engine condition, etc.

The move time may indicate a time associated with accelerating the vehicle. For example, the move time may be when a driver may wish to move the vehicle. For example, at block 306, process 300 may implement system 100 of FIG. 1 to determine move time 120.

Although block 304 and block 306 are illustrated sequentially (with block 304 preceding block 306), and as separate blocks, block 304 and block 306 may occur simultaneously, in parallel, in the same block, or with block 306 preceding block 304.

At decision block 308, the conditions determined at block 304 may be checked and the engine-off duration determined at decision block 308 may be checked against a threshold. If the conditions of the idle-engine shutdown feature are not satisfied (e.g., if the heater is running), process 300 may proceed to block 312. If the engine-off duration is not greater than the threshold, process 300 may proceed to block 312. If the conditions of the idle-engine shutdown feature are satisfied and the engine-off duration is greater than the threshold, process 300 may proceed to block 310.

At block 310 the engine may be shutdown according to the idle-engine shutdown feature. For example, based on the vehicle being stopped, and based on the idle-engine shutdown feature conditions being satisfied, the idle-engine shutdown feature may shut the engine down.

At block 312, the idle-engine shutdown feature may be prevented from shutting down the engine. For example, even if the idle-engine shutdown feature conditions are satisfied (e.g., the car is stopped, the heater is not running and the temperature in the vehicle is above a threshold, the AC is not running and the temperature in the vehicle is above a threshold, the battery has sufficient charge), process 300 may prevent the idle-engine shutdown feature from shutting down the engine. In other words, process 300 may keep the engine running. Process 300 may prevent the idle-engine shutdown feature from shutting down the engine based on the determined engine-off duration not exceeding the threshold.

Figure 4:
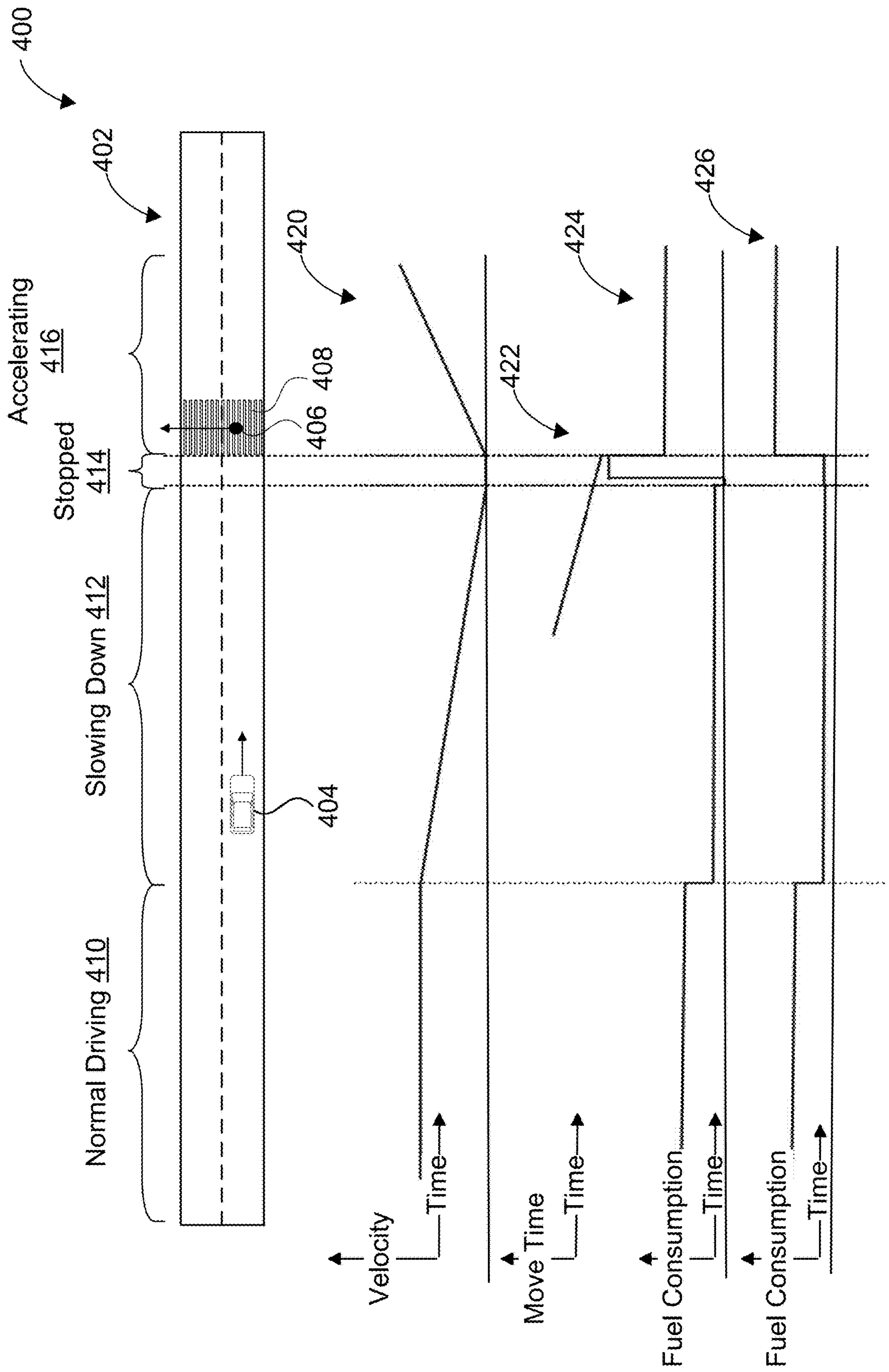
FIG. 4 includes several diagrams illustrating an example scenario in which the systems and techniques may prevent an idle-engine shutdown feature from shutting down an engine, according to various aspects of the present disclosure.

FIG. 4 includes several diagrams illustrating an example scenario 400 in which the systems and techniques may prevent an idle-engine shutdown feature from shutting down an engine, according to various aspects of the present disclosure. FIG. 4 includes an illustration 402 of a vehicle 404 slowing down for a pedestrian 406 crossing the road at a crosswalk 408.

Scenario 400 includes a period 410 during which vehicle 404 travels normally, followed by a period 412 during which vehicle 404 slows down, preparing to stop at crosswalk 408, followed by period 414 during which vehicle 404 is stopped at crosswalk 408 while pedestrian 406 crosses the road, followed by period 416 during which vehicle 404 accelerates.

FIG. 4 includes a graph 420 illustrating a velocity of vehicle 404 over time. The time axis of graph 420 is aligned with period 410, period 412, period 414, and period 416 to illustrate the velocity of vehicle 404 during the period 410, period 412, period 414, and period 416. Graph 420 is illustrative without including a scale. However, the minimum of graph 420 may be zero velocity—indicating that vehicle 404 is stopped.

FIG. 4 includes a graph 422 illustrating a move time that may be calculated and updated over time. The time axis of graph 422 is aligned with period 410, period 412, period 414, and period 416 to illustrate the move time calculated by vehicle 404 during the period 410, period 412, period 414, and period 416. For example, while vehicle 404 is slowing down during period 412 (e.g., when vehicle 404 has a velocity below a threshold), vehicle 404 may begin determining and updating a move time. The move time may be an indication of when vehicle 404 may begin moving again. The move time may be determined, for example, by system 100 of FIG. 1. The move time may be based on where pedestrian 406 is on the road. For example, the move time may be based on a prediction of when pedestrian 406 will be off the road.

FIG. 4 includes a graph 424 illustrating fuel consumption as a function of time to illustrate a default operation of an idle-engine shutdown feature. The time axis of graph 424 is aligned with period 410, period 412, period 414, and period 416 to illustrate the fuel consumption of vehicle 404 during the period 410, period 412, period 414, and period 416. Graph 424 illustrates illustrative fuel consumption of according to an idle-engine shutdown feature that shuts an engine down during period 414. Graph 424 is illustrative without including a vertical scale. However, the minimum of graph 424 may be zero fuel consumption (e.g., based on the engine not running).

During period 410, a fuel consumption of vehicle 404 may be steady while vehicle 404 travels at a substantially constant speed. During period 412, vehicle 404 may be slowing down and a driver of vehicle 404 may not be pressing the accelerator pedal. Thus, during period 412, the fuel consumption of vehicle 404 may be lower than the fuel consumption was during period 410.

At the beginning of period 414, vehicle 404 may stop. During period 414, an idle-engine shutdown feature may shut an engine of vehicle 404 down. Thus, early in period 414, a fuel consumption of vehicle 404 may drop to zero.

As the person leaves the road, a driver of vehicle 404 may release a brake pedal of vehicle 404 and/or depress the accelerator pedal. Based on the driver releasing the brake pedal and/or pressing the accelerator pedal, vehicle 404 may restart the engine of vehicle 404. While the engine is starting, a fuel consumption of vehicle 404 may spike. During period 416, as vehicle 404 accelerates away from crosswalk 408, a fuel consumption of vehicle 404 may be at a level higher than the fuel consumption was during period 410.

An amount of fuel conserved while the engine is off during period 414 may be less than the amount of fuel consumed while starting the engine. Thus, the idle-engine shutdown feature may cause vehicle 404 to consume more fuel than the idle-engine shutdown feature conserved.

FIG. 4 includes a graph 426 illustrating fuel consumption as a function of time to illustrate operation of an idle-engine shutdown feature according to various aspects of the present disclosure. For example, the systems and techniques may prevent an idle-engine shutdown feature from shutting down an engine of vehicle 404 during period 414. The time axis of graph 426 is aligned with period 410, period 412, period 414, and period 416 to illustrate the fuel consumption of vehicle 404 during the period 410, period 412, period 414, and period 416. Graph 426 illustrates illustrative fuel consumption of according to various aspects of the present disclosure to how preventing an idle-engine shutdown feature from shutting an engine down during period 414 conserves fuel. Graph 426 is illustrative without including a vertical scale. However, the a horizontal line is added below the line of graph 426 to indicate that because the engine remains running, the fuel consumption does not reach zero.

Fuel consumption and operation of vehicle 404 may be the same during period 410, period 412, and period 416 in cases in which vehicle 404 allows an idle-engine shutdown feature to shut down the engine during period 414 and in the case in which vehicle 404 prevents the idle-engine shutdown feature from shutting the engine down during period 414.

During period 412 vehicle 404 may determine a move time (e.g., as illustrated by graph 420). Additionally, vehicle 404 may determine an engine-off duration based on the move time. Based on the engine-off duration not exceeding a threshold, vehicle 404 may determine to prevent the idle-engine shutdown feature from shutting down the engine. Thus, during period 414 the engine may continue running and not drop to zero.

Vehicle 404 may conserve fuel by preventing the idle-engine shutdown feature from shutting the engine down. For example, graph 426 may represent less fuel consumption than graph 424.

Figure 5:
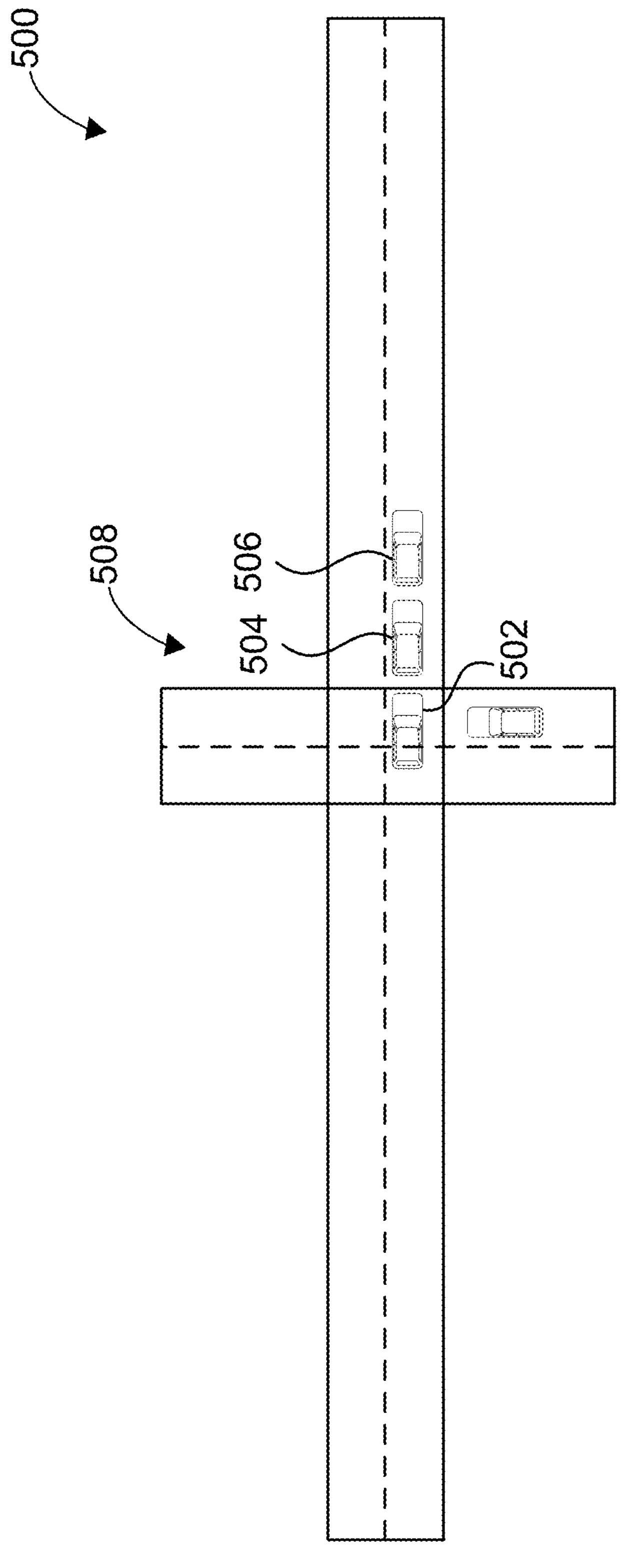
FIG. 5 is an illustration of an example scenario in which an engine of a vehicle may be controlled, according to various aspects of the present disclosure.

FIG. 5 is an illustration of an example scenario 500 in which an engine of a vehicle 502 may be controlled, according to various aspects of the present disclosure. For example, prior to the time illustrated in FIG. 5, a light at the intersection 508 may be green in the direction in which vehicle 502 is travelling and vehicle 502 may enter intersection 508. However, traffic ahead of vehicle 502 (e.g., vehicle 504 and vehicle 506) may be stopped. Because vehicle 504 is stopped ahead of vehicle 502, vehicle 502 may not be able to exit intersection 508 and may be stuck in intersection 508.

According to default operation of an idle-engine shutdown feature, when vehicle 502 stops behind vehicle 504, the idle-engine shutdown feature may shut the engine of vehicle 502 down. This may be undesirable because the driver of vehicle 502 may be anxious and may wish to leave intersection 508 as quickly as possible.

According to various aspects of the disclosure, the systems and techniques may prevent the idle-engine shutdown feature from shutting down the engine of vehicle 502. Thus, the engine of vehicle 502 may remain running as long as vehicle 502 is stopped in intersection 508. This may allow the driver of vehicle 502 to move vehicle 502 out of intersection 508 sooner. Further, leaving the engine of vehicle 502 running may feel better to a driver of vehicle 502.

Figure 6:
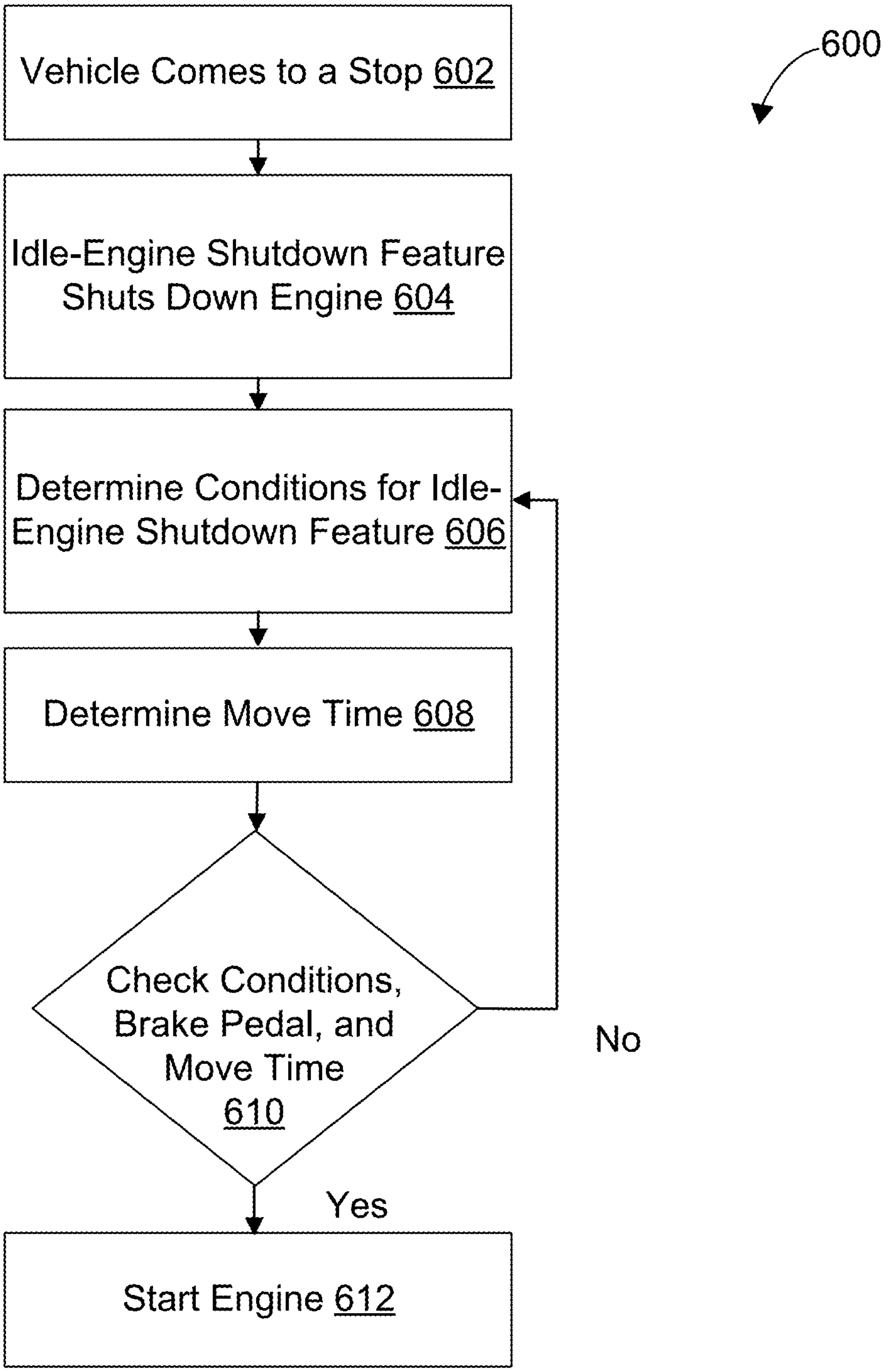
FIG. 6 includes an example flowchart illustrating a process for controlling an engine, according to various aspects of the present disclosure.

FIG. 6 includes an example flowchart illustrating a process 600 for controlling an engine, according to various aspects of the present disclosure. A computing system of a vehicle may implement process 600 to determine, when a vehicle is stopped and an engine is shutdown (e.g., according to an idle-engine shutdown feature), when to restart the engine.

The systems and techniques may determine to restart an engine based on a determined move time. For example, an idle-engine shutdown feature may shut down an engine of a vehicle. The systems and techniques may determine a move time as described above (e.g., as described with regards to system 100 of FIG. 1). Additionally, the systems and techniques may obtain or determine an engine-startup duration. The systems and techniques may determine to start the engine based on the move time and the engine-startup duration. For example, the systems and techniques may start the engine the engine-startup duration before the move time. In other words, the systems and techniques may begin starting the engine the engine-startup duration before the move time. In this way, the systems and techniques may cause the engine to be running at the move time (e.g., the time predicted when the driver may want to accelerate).

For example, at block 602, a vehicle may come to a stop. At block 604, an idle-engine shutdown feature may shut down the engine of the vehicle.

At block 606, conditions for an idle-engine shutdown feature may be determined. For example, the idle-engine shutdown feature may have conditions that the idle-engine shutdown feature uses to determine when to restart an engine of a stopped vehicle. For example, the idle-engine shutdown feature may restart an engine if a driver releases a brake pedal and/or if the driver depresses the accelerator pedal.

At block 608, process 600 may determine a move time. The move time may be determined by system 100 of FIG. 1. The move time may be a prediction of when the driver may want to move the vehicle. The move time may be predicted based on, for example, sensor data from one or more sensors of the vehicle, V2X messages received by the vehicle, a catalog of predetermined situations, and/or a map of the environment.

Although block 606 and block 608 are illustrated sequentially (with block 606 preceding block 608), and as separate blocks, block 606 and block 608 may occur simultaneously, in parallel, in the same block, or with block 608 preceding block 606.

At decision block 610, process 600 may check, conditions of the idle-engine shutdown feature, a brake pedal, an accelerator pedal, and/or the move time to determine whether to restart the engine. For example, process 600 may restart the engine if conditions of the idle-engine shutdown feature are satisfied. For example, process 600 may restart the engine if a brake pedal is no longer depressed and/or if an accelerator pedal is depressed. In some aspects, the idle-engine shutdown feature may be based on the brake pedal and/or the accelerator pedal. Additionally or alternatively, at decision block 610, process 600 may check the position of the brake pedal and/or the accelerator pedal may be checked in addition to checking any idle-engine shutdown feature conditions. Additionally, at decision block 610, process 600 may determine to restart the engine based on the move time. For example, process 600 may determine to start the engine the engine-startup duration before the move time. In other words, process 600 may begin starting the engine the engine-startup duration before the move time.

At decision block 610, process 600 may determine to restart the engine if any of: the idle-engine shutdown feature conditions are satisfied, the brake pedal is released, the accelerator pedal is depressed, or if the current time is the engine-startup duration (or less) away from the determined move time. If, at decision block 610, process 600 determines that any of the conditions for restarting the engine are satisfied, process 600 may proceed to block 612. At block 612 the engine may be started.

If, at decision block 610, process 600 determines that all of the conditions for restarting the engine are unsatisfied, decision block 610 may return to block 606 and resume checking the idle-engine shutdown feature conditions and determining the move time. For example, process 600 may update the move time over time.

Figure 7:
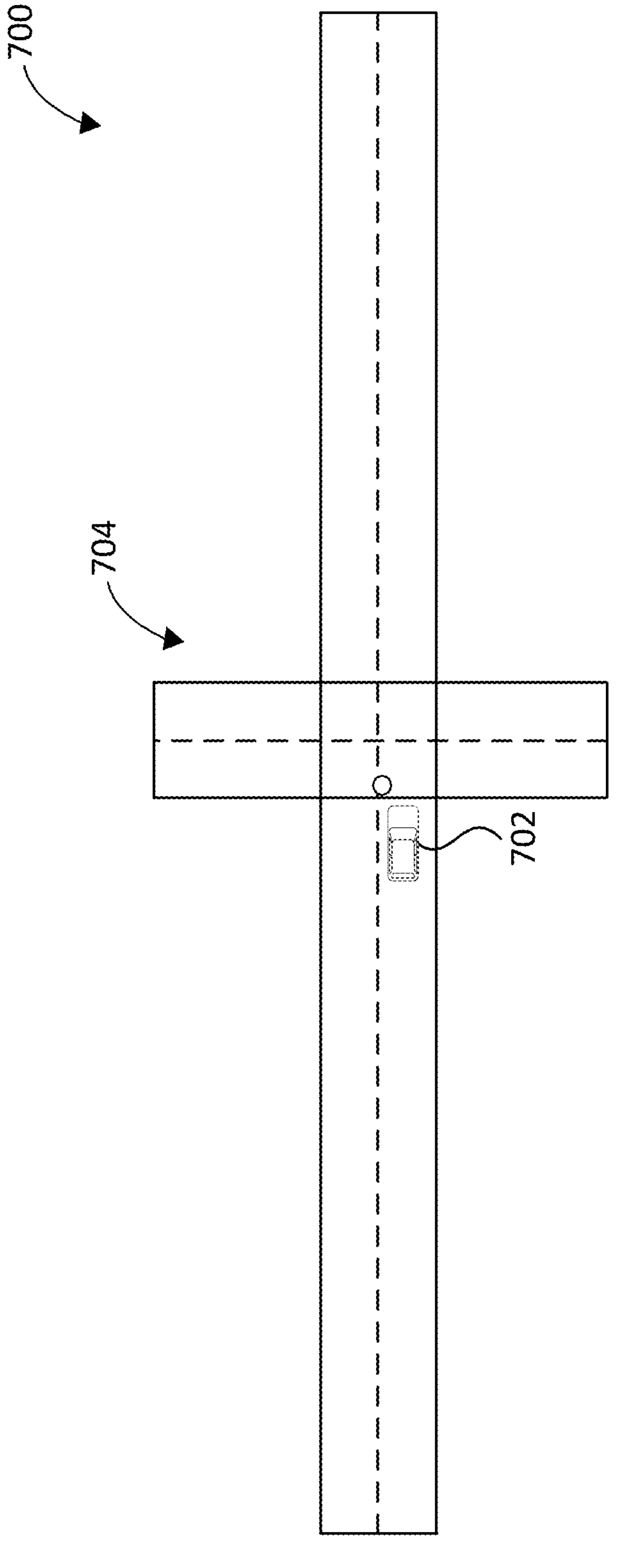
FIG. 7 is an illustration of an example scenario in which an engine of a vehicle may be controlled, according to various aspects of the present disclosure.

FIG. 7 is an illustration of an example scenario 700 in which an engine of a vehicle 702 may be controlled, according to various aspects of the present disclosure. For example, prior to the time illustrated in FIG. 7, a light at the intersection 704 may be red in the direction in which vehicle 702 is travelling and vehicle 702 may stop before entering intersection 704. An idle-engine shutdown feature may shutdown the engine of vehicle 702 while vehicle 702 is stopped at intersection 704. At the time illustrated in FIG. 7, the light may change to green in the direction in which vehicle 702 is travelling.

According to default operations of an idle-engine shutdown feature, after the light changes to green, a driver may remove their foot from the brake pedal and begin depressing the accelerator. The idle-engine shutdown feature may restart the engine when the driver removes their foot.

According to various aspects of the disclosure, the systems and techniques may predict a move time prior to the light changing to green. For example, the systems and techniques may receive a V2X message from the light indicating the upcoming change of color. Additionally or alternatively, the systems and techniques may observe (e.g., using one or more sensors of vehicle 702) traffic patterns and/or lights of the traffic signal in the other direction. The systems and techniques may predict that the light will change to green in the direction in which vehicle 702 is travelling based on the lights changing to yellow and/or red in the perpendicular direction.

Having predicted the move time, the systems and techniques may begin restarting an engine of vehicle 702 prior to (e.g., an engine-startup duration prior to) the move time. By beginning to restart the engine an engine-startup duration prior to the move time, the systems and techniques may cause the engine to be running by the move time. This may allow vehicle 702 to move sooner than if the engine of vehicle 702 were restarted according to the default operations of the idle-engine shutdown feature.

Figure 8:
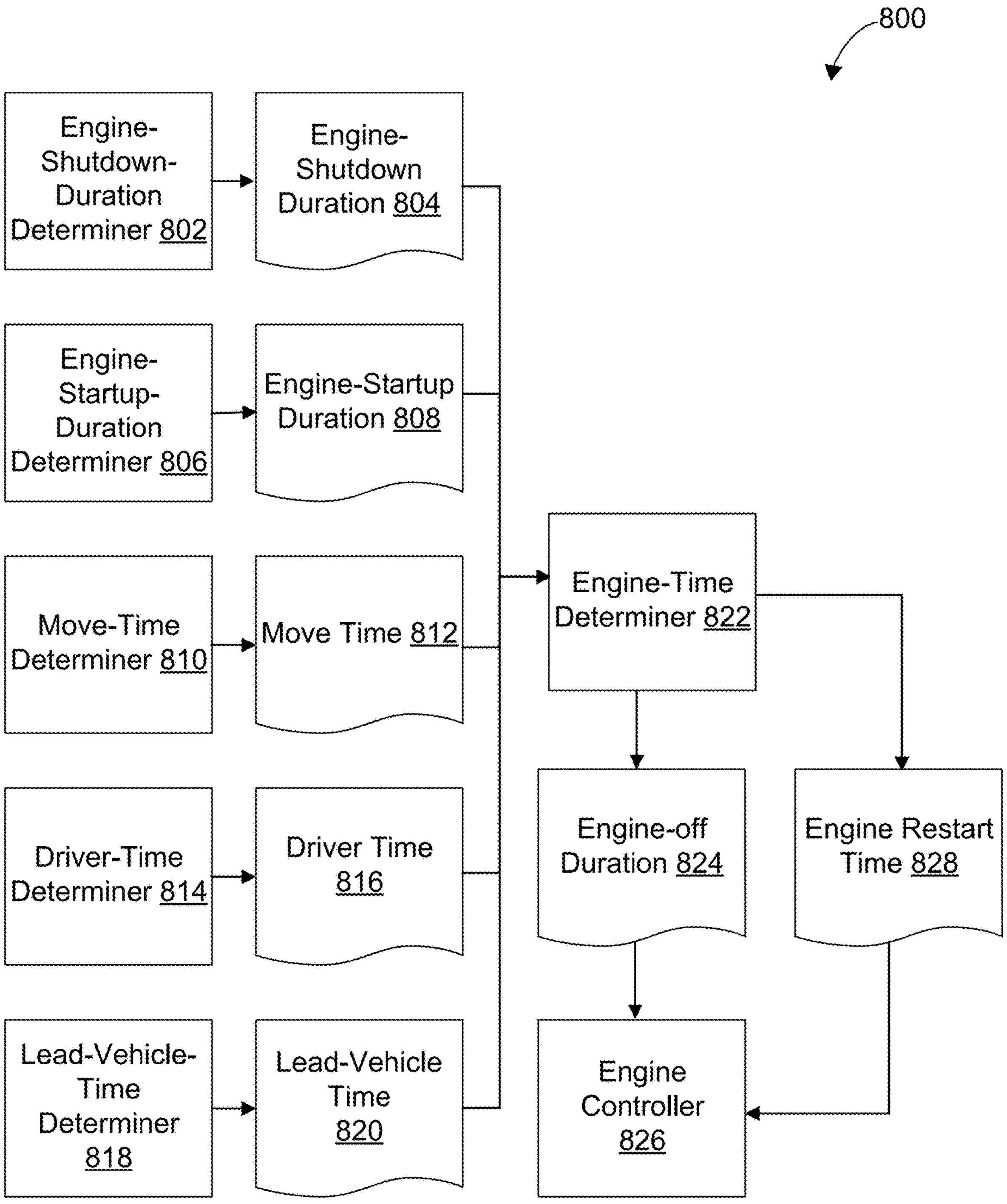
FIG. 8 is a block diagram illustrating an example system for controlling an engine of a vehicle, according to various aspects of the present disclosure.

FIG. 8 is a block diagram illustrating an example system 800 for controlling an engine of a vehicle, according to various aspects of the present disclosure. System 800 may prevent an engine from shutting down if an engine-off duration 824 is shorter than a threshold. For example, system 800 may implement process 300 of FIG. 3. Additionally or alternatively, system 800 may start an engine based on an engine restart time 828. For example, system 800 may implement process 600 of FIG. 6.

In general, an engine-shutdown-duration determiner 802 may determine an engine-shutdown duration 804, an engine-startup-duration determiner 806 may determine an engine-startup duration 808, a move-time determiner 810 may determine a move time 812, a driver-time determiner 814 may determine a driver time 816 and a lead-vehicle-time determiner 818 may determine a lead-vehicle time 820. In some aspects, an engine-time determiner 822 may determine an engine-off duration 824 based on engine-shutdown duration 804, engine-startup duration 808, move time 812, driver time 816 and/or lead-vehicle time 820 and an engine controller 826 may control an engine of a vehicle (e.g., prevent a shutdown of the engine) based on engine-off duration 824.

Additionally or alternatively, engine-time determiner 822 may determine an engine restart time 828 based on engine-startup duration 808, move time 812, driver time 816, and/or lead-vehicle time 820 and engine controller 826 may control the engine (e.g., restart the engine) based on engine restart time 828.

In some aspects, engine-shutdown duration 804 may be predetermined (e.g., by a manufacturer of the vehicle). In some aspects, engine-shutdown duration 804 may be tracked by engine-shutdown-duration determiner 802. For example, engine-shutdown-duration determiner 802 may time engine shutdowns and determine engine-shutdown duration 804 as a rolling average of the times it takes to shut down the engine.

In some aspects, engine-startup duration 808 may be predetermined (e.g., by a manufacturer of the vehicle). In some aspects, engine-startup duration 808 may be tracked by engine-startup-duration determiner 806. For example, engine-startup-duration determiner 806 may time engine startups and determine engine-startup duration 808 as a rolling average of the times it takes to start the engine.

Move-time determiner 810 may determine move time 812 based on sensor data, V2X data, a catalog of situations, and/or map data. Additional detail regarding determining a move time is given with regard to example system 100 of FIG. 1. For example, move-time determiner 810 may be an example of system 100 of FIG. 1.

In some aspects, engine-time determiner 822 may determine engine-off duration 824 based on engine-shutdown duration 804, engine-startup duration 808, and move time 812. For example, engine-time determiner 822 may determine engine-off duration 824 according to:

$$\text{engine-off duration} = \text{move time} - \text{current time} - \text{engine-shutdown duration} - \text{engine-startup duration}.$$

Additionally or alternatively, in some aspects, engine-time determiner 822 may determine engine restart time 828 based on engine-startup duration 808 and move time 812. For example, engine-time determiner 822 may determine engine restart time 828 according to:

$$\text{engine-restart time} = \text{move time} - \text{engine-startup duration}.$$

In some aspects, system 800 may include a driver-time determiner 814 that may determine a driver time 816. In such aspects, engine-time determiner 822 may determine engine-off duration 824 and/or engine restart time 828 based on driver time 816.

Driver-time determiner 814 may determine driver time 816 based on behavior of a driver. For example, driver-time determiner 814 may measure a time between when an engine is started and a determined move time and the time a driver presses the accelerator pedal. Some drivers may be aggressive and may press the accelerator pedal soon after an engine is started and/or just when move time predicts the driver will want to move the vehicle. Other drivers may be passive and may wait for a second before pressing an accelerator after the engine is started and/or after the predicted move time.

Driver-time determiner 814 may track the behavior of a driver, for example, timing the delay between when the engine starts and when the driver presses the accelerator. driver-time determiner 814 may determine driver time 816 based on a rolling average of times between an engine starting and a driver pressing an accelerator pedal. Driver time 816 may, for example, be greater than zero indicating a delay between when the engine is running and when the driver presses the accelerator pedal. Alternatively, driver time 816 may be less than zero, indicating that the driver is ready to press the accelerator pedal before the engine is on or before the move time.

In some aspects, driver-time determiner 814 may reset driver time 816 and determine driver time 816 each driving cycle (e.g., each trip). Alternatively, driver-time determiner 814 may store driver time 816. In some aspects, driver-time determiner 814 may store driver time 816 relative to the vehicle. In other aspects, driver-time determiner 814 may track behavior (e.g., drive times) of separate drivers separately. For example, driver-time determiner 814 may determine which driver is driving the vehicle based on seat settings, a key used to start the vehicle, or other characteristics of the driver.

In some aspects, engine-time determiner 822 may take driver time 816 into account when determining engine-off duration 824. For example, engine-time determiner 822 may determine engine-off duration 824 according to:

$$\text{engine-off duration} = \text{move time} - \text{current time} - \text{engine-shutdown duration} - \text{engine-startup duration} + \text{driver time}.$$

Additionally or alternatively, in some aspects, engine-time determiner 822 may determine engine restart time 828 based on driver time 816. For example, engine-time determiner 822 may determine engine restart time 828 according to:

engine-restart time=move time−engine-startup duration+driver time.

In some aspects, system 800 may include a lead-vehicle-time determiner 818 that may determine a lead-vehicle time 820. In such aspects, engine-time determiner 822 may determine engine-off duration 824 and/or engine restart time 828 based on lead-vehicle time 820.

Lead-vehicle-time determiner 818 may determine lead-vehicle time 820 based on behavior of a vehicle in front of the vehicle (e.g., a lead vehicle). The vehicle may not be able to move (without rear-ending the lead vehicle) until the lead vehicle has moved. Lead-vehicle-time determiner 818 may measure a time between a determined move time and the time the lead vehicle moves a threshold distance from the vehicle. Some leave vehicles may be aggressive, and others may be passive.

Lead-vehicle-time determiner 818 may track the behavior (e.g., the time between the move time and the time the lead vehicle moves sufficiently to allow the vehicle to move) of the lead vehicle over time (e.g., through a number of stops and starts at traffic lights, stop signs, crosswalks etc.). Lead-vehicle-time determiner 818 may determine lead-vehicle time 820 based on a rolling average of times between respective move times and corresponding times the lead vehicle moves sufficiently to allow the vehicle to move. Lead-vehicle time 820 may, for example, be greater than zero indicating a delay between when the move time and when the lead vehicle moves beyond the threshold. Alternatively, lead-vehicle time 820 may be less than zero, indicating that the lead vehicle moves beyond the threshold before the move time.

Lead-vehicle-time determiner 818 may determine lead-vehicle time 820 for a given lead vehicle and apply lead-vehicle time 820 while the given lead vehicle is directly in front of the vehicle. Lead-vehicle-time determiner 818 may determine a separate lead-vehicle time 820 for a separate vehicle that comes in front of the vehicle.

In some aspects, engine-time determiner 822 may take lead-vehicle time 820 into account when determining engine-off duration 824. For example, engine-time determiner 822 may determine engine-off duration 824 according to:

engine-off duration=move time−current time−engine-shutdown duration−engine-startup duration+lead-vehicle time.

Additionally or alternatively, in some aspects, engine-time determiner 822 may determine engine restart time 828 based on lead-vehicle time 820. For example, engine-time determiner 822 may determine engine restart time 828 according to:

engine-restart time=move time−engine-startup duration+lead-vehicle time.

In some aspects, engine-time determiner 822 may take driver time 816 and lead-vehicle time 820 into account when determining engine-off duration 824. For example, engine-time determiner 822 may determine engine-off duration 824 according to:

engine-off duration=move time−current time−engine-shutdown duration−engine-startup duration+driver time+lead-vehicle time.

Additionally or alternatively, in some aspects, engine-time determiner 822 may determine engine restart time 828 based on driver time 816 and lead-vehicle time 820. For example, engine-time determiner 822 may determine engine restart time 828 according to:

engine-restart time=move time−engine-startup duration+driver time+lead-vehicle time.

Engine controller 826 may control an engine of a vehicle based on engine-off duration 824 and/or engine restart time 828. For example, engine controller 826 may prevent an idle-engine shutdown feature from shutting down an engine of the vehicle based on engine-off duration 824 being shorter than a threshold (e.g., as described with regard to process 300 of FIG. 3). Additionally or alternatively, engine controller 826 may start an engine of a vehicle based on engine restart time 828 (e.g., as described with regard to process 600 of FIG. 6).

Figure 9A:
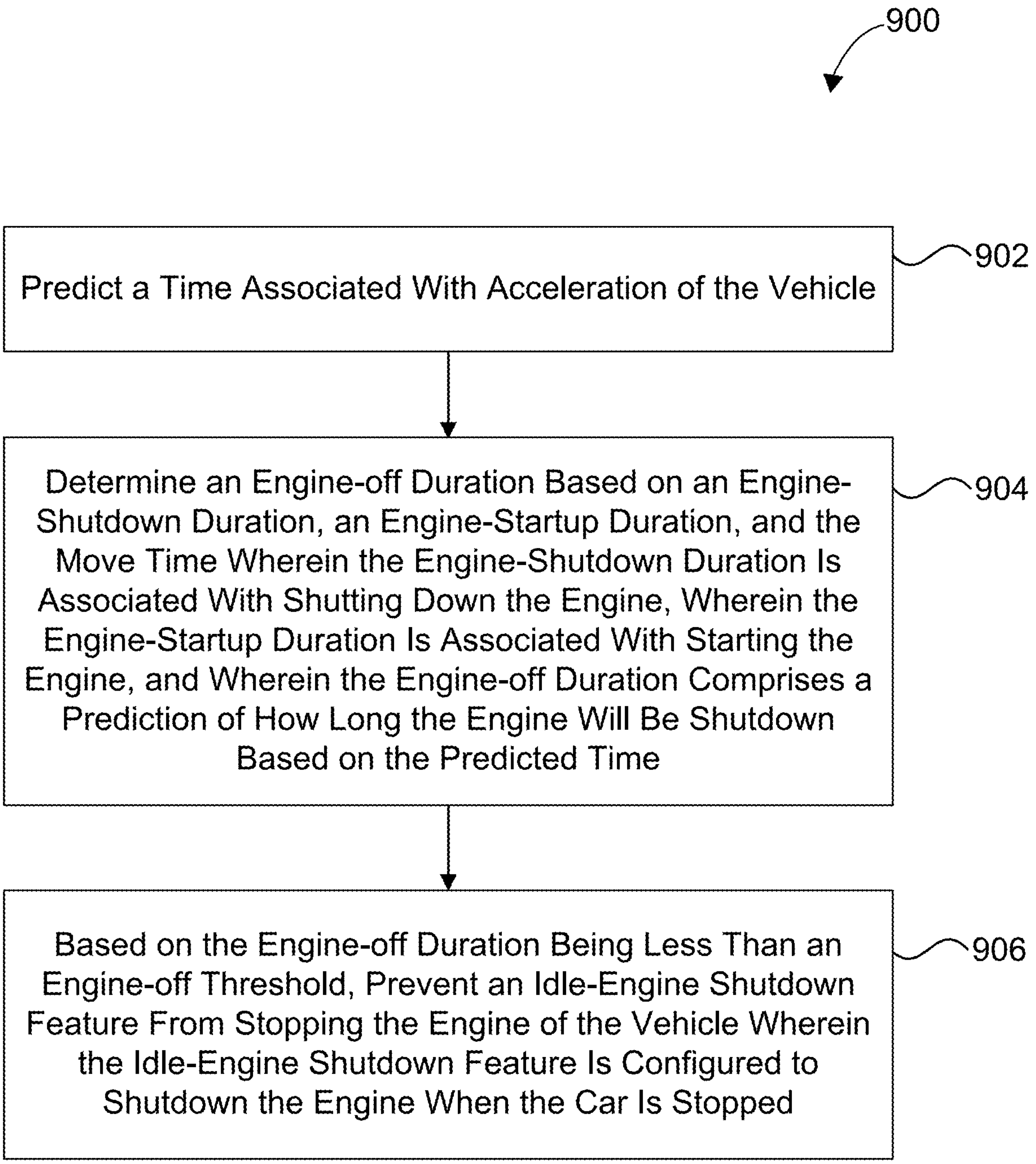
FIG. 9A is a flow diagram illustrating an example process for controlling an engine of a vehicle, in accordance with aspects of the present disclosure.

FIG. 9A is a flow diagram illustrating an example process 900 for controlling an engine of a vehicle, in accordance with aspects of the present disclosure. One or more operations of process 900 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the one or more operations of process 900. The one or more operations of process 900 may be implemented as software components that are executed and run on one or more processors.

At block 902, a computing device (or one or more components thereof) may predict a time associated with acceleration of the vehicle. For example, a computing system of a vehicle may implement system 800, including move-time determiner 810. Move-time determiner 810 may determine move time 812.

In some aspects, the time is predicted based on sensor data captured by one or more sensors of the vehicle. For example, the computing system of the vehicle may implement system 100. System 100 may determine move time 120 based, at least in part, on sensor data 106.

In some aspects, the time is predicted based on a vehicle-to-everything (V2X) message received by the vehicle. For example, system 100 may determine move time 120 based, at least in part, on V2X messages 108.

In some aspects, the V2X message may be from traffic light at which the vehicle is stopped and wherein the V2X message indicates when traffic light will change. In some aspects, the V2X message may be from roadside unit proximate to a traffic light at which the vehicle is stopped and wherein the V2X message indicates when traffic light will change. In some aspects, the V2X message may be from a lead vehicle ahead of the vehicle and wherein the V2X message indicates when the lead vehicle will move. For example, V2X messages 108 may be, or may include, messages from a traffic light, a road-side unit, and/or other vehicles.

In some aspects, the time is predicted based on a map of an environment of the vehicle. For example, system 100 may determine move time 120 based, at least in part, on map data 104.

In some aspects, the time is predicted based on a catalog of predefined situations. For example, system 100 may determine move time 120 based, at least in part, on situation catalog 102.

In some aspects, the computing device (or one or more components thereof) may track objects based on sensor data captured by one or more sensors of the vehicle. The time may be predicted based on tracked objects in a zone of interest. For example, a computing system of vehicle 202 may implement system 100, including situation analyzer 110 and/or participant analyzer 114, and may track objects in any of zones of interest 204, 206, and/or 208 (e.g., based on sensor data 106) and determine move time 116 based on tracked objects in in any of zones of interest 204, 206, and/or 208.

In some aspects, the zone of interest may be, or may include, a geometrically shaped area at least partially in front of or behind the vehicle. For example, the zone of interest may be the same as, or substantially similar to zone of interest 204 of FIG. 2.

In some aspects, the computing device (or one or more components thereof) may determine the zone of interest based on a map of an environment of the vehicle. For example, a computing system of environment 200 may determine the zone of interest may be the same as, or substantially similar to zone of interest 208 of FIG. 2 based on a map of environment 200.

In some aspects, the computing device (or one or more components thereof) may determine the zone of interest based on a planned route of the vehicle. For example, a computing system of environment 200 may determine the zone of interest may be the same as, or substantially similar to zone of interest 206 of FIG. 2 based on a planned route of vehicle 202.

At block 904, the computing device (or one or more components thereof) may determine an engine-off duration based on an engine-shutdown duration, an engine-startup duration, and the time wherein the engine-shutdown duration is associated with shutting down the engine, wherein the engine-startup duration is associated with starting the engine, and wherein the engine-off duration comprises a prediction of how long the engine will be shutdown based on the predicted time. For example, engine-shutdown-duration determiner 802 may determine engine-shutdown duration 804 and engine-startup-duration determiner 806 may determine engine-startup duration 808. Engine-time determiner 822 may determine engine-off duration 824 based on engine-shutdown duration 804, engine-startup duration 808, and move time 812.

At block 906, the computing device (or one or more components thereof) may, based on the engine-off duration being less than an engine-off threshold, prevent an idle-engine shutdown feature from stopping the engine of the vehicle, wherein the idle-engine shutdown feature is configured to shut down the engine when the vehicle is stopped. For example, engine controller 826 may prevent an idle-engine shutdown feature from stopping the engine of the vehicle.

Figure 9B:
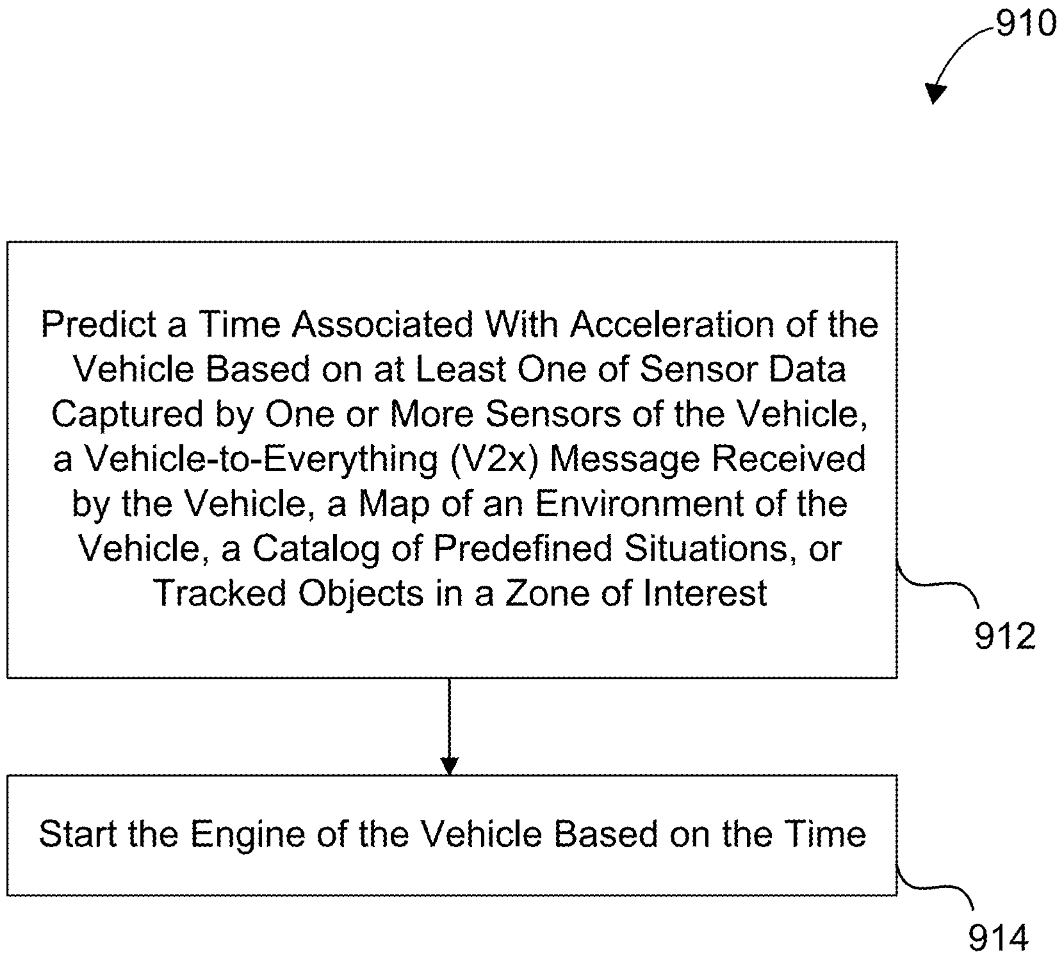
FIG. 9B is a flow diagram illustrating an example process for controlling an engine of a vehicle, in accordance with aspects of the present disclosure.

FIG. 9B is a flow diagram illustrating an example process 910 for controlling an engine of a vehicle, in accordance with aspects of the present disclosure. One or more operations of process 910 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the one or more operations of process 910. The one or more operations of process 910 may be implemented as software components that are executed and run on one or more processors.

At block 912, a computing device (or one or more components thereof) may predict a time associated with acceleration of the vehicle based on at least one of sensor data captured by one or more sensors of the vehicle, a vehicle-to-everything (V2X) message received by the vehicle, a map of an environment of the vehicle, a catalog of predefined situations, or tracked objects in a zone of interest. For example, a computing system of a vehicle may implement system 800, including move-time determiner 810. Move-time determiner 810 may determine move time 812. Move-time determiner 810 may implement system 100 and may determine move time 120 based on any or all of sensor data 106, V2X messages 108, map data 104, situation catalog 102, and/or objects tracked in a zone of interest, such as any of zones of interest 204, 206, and/or 208.

In some aspects, the time is predicted based on sensor data captured by one or more sensors of the vehicle. For example, the computing system of the vehicle may implement system 100. System 100 may determine move time 120 based, at least in part, on sensor data 106.

In some aspects, the time is predicted based on a vehicle-to-everything (V2X) message received by the vehicle. For example, system 100 may determine move time 120 based, at least in part, on V2X messages 108.

In some aspects, the V2X message may be from traffic light at which the vehicle is stopped and wherein the V2X message indicates when traffic light will change. In some aspects, the V2X message may be from roadside unit proximate to a traffic light at which the vehicle is stopped and wherein the V2X message indicates when traffic light will change. In some aspects, the V2X message may be from a lead vehicle ahead of the vehicle and wherein the V2X message indicates when the lead vehicle will move. For example, V2X messages 108 may be, or may include, messages from a traffic light, a road-side unit, and/or other vehicles.

In some aspects, the time is predicted based on a map of an environment of the vehicle. For example, system 100 may determine move time 120 based, at least in part, on map data 104.

In some aspects, the time is predicted based on a catalog of predefined situations. For example, system 100 may determine move time 120 based, at least in part, on situation catalog 102.

In some aspects, the computing device (or one or more components thereof) may track objects based on sensor data captured by one or more sensors of the vehicle. The time may be predicted based on tracked objects in a zone of interest. For example, a computing system of vehicle 202 may implement system 100, including situation analyzer 110 and/or participant analyzer 114, and may track objects in any of zones of interest 204, 206, and/or 208 (e.g., based on sensor data 106) and determine move time 116 based on tracked objects in in any of zones of interest 204, 206, and/or 208.

In some aspects, the zone of interest may be, or may include, a geometrically shaped area at least partially in front of or behind the vehicle. For example, the zone of interest may be the same as, or substantially similar to zone of interest 204 of FIG. 2.

In some aspects, the computing device (or one or more components thereof) may determine the zone of interest based on a map of an environment of the vehicle. For example, a computing system of environment 200 may determine the zone of interest may be the same as, or substantially similar to zone of interest 208 of FIG. 2 based on a map of environment 200.

In some aspects, the computing device (or one or more components thereof) may determine the zone of interest based on a planned route of the vehicle. For example, a computing system of environment 200 may determine the zone of interest may be the same as, or substantially similar to zone of interest 206 of FIG. 2 based on a planned route of vehicle 202.

At block 914, the computing device (or one or more components thereof) may start the engine of the vehicle based on the time. For example, engine-time determiner 822 may determine engine restart time 828 and engine controller 826 may restart an engine of the vehicle based on engine restart time 828.

In some aspects, the computing device (or one or more components thereof) may override an idle-engine shutdown feature to start the engine of the vehicle. For example, engine controller 826 may override an idle-engine shutdown feature to restart the engine of the vehicle based on engine restart time 828.

In some aspects, the engine may be started while a driver is depressing a brake pedal of the vehicle. For example, engine controller 826 may restart the engine of the vehicle while a driver is depressing a brake pedal of the vehicle.

In some aspects, the engine may be started before a driver depresses an accelerator pedal of the vehicle. For example, engine controller 826 may restart the engine of the vehicle before a driver depresses an accelerator pedal of the vehicle.

In some examples, as noted previously, the methods described herein (e.g., process 300 of FIG. 3, process 600 of FIG. 6, process 900 of FIG. 9A, and/or other methods described herein) can be performed, in whole or in part, by a computing device or apparatus. In one example, one or more of the methods can be performed by system 100 of FIG. 1, vehicle 202 of FIG. 2, vehicle 404 of FIG. 4 according to graph 426, vehicle 502 of FIG. 5, vehicle 702 of FIG. 7, system 800 of FIG. 8, or by another system or device. In another example, one or more of the methods (e.g., process 900, and/or other methods described herein) can be performed, in whole or in part, by the computing-device architecture 1300 shown in FIG. 13. For instance, a computing device with the computing-device architecture 1300 shown in FIG. 13 can include, or be included in, the components of the system 100, vehicle 202, vehicle 404 according to graph 426, vehicle 502, vehicle 702, system 800, and can implement the operations of process 300, process 600, process 900, and/or other process described herein. In some cases, the computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component(s). The network interface can be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 300, process 600, process 900, and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 300, process 600, process 900, and/or other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program comprising a plurality of instructions executable by one or more processors. The computer-readable or machine-readable storage medium can be non-transitory.

Figure 10:
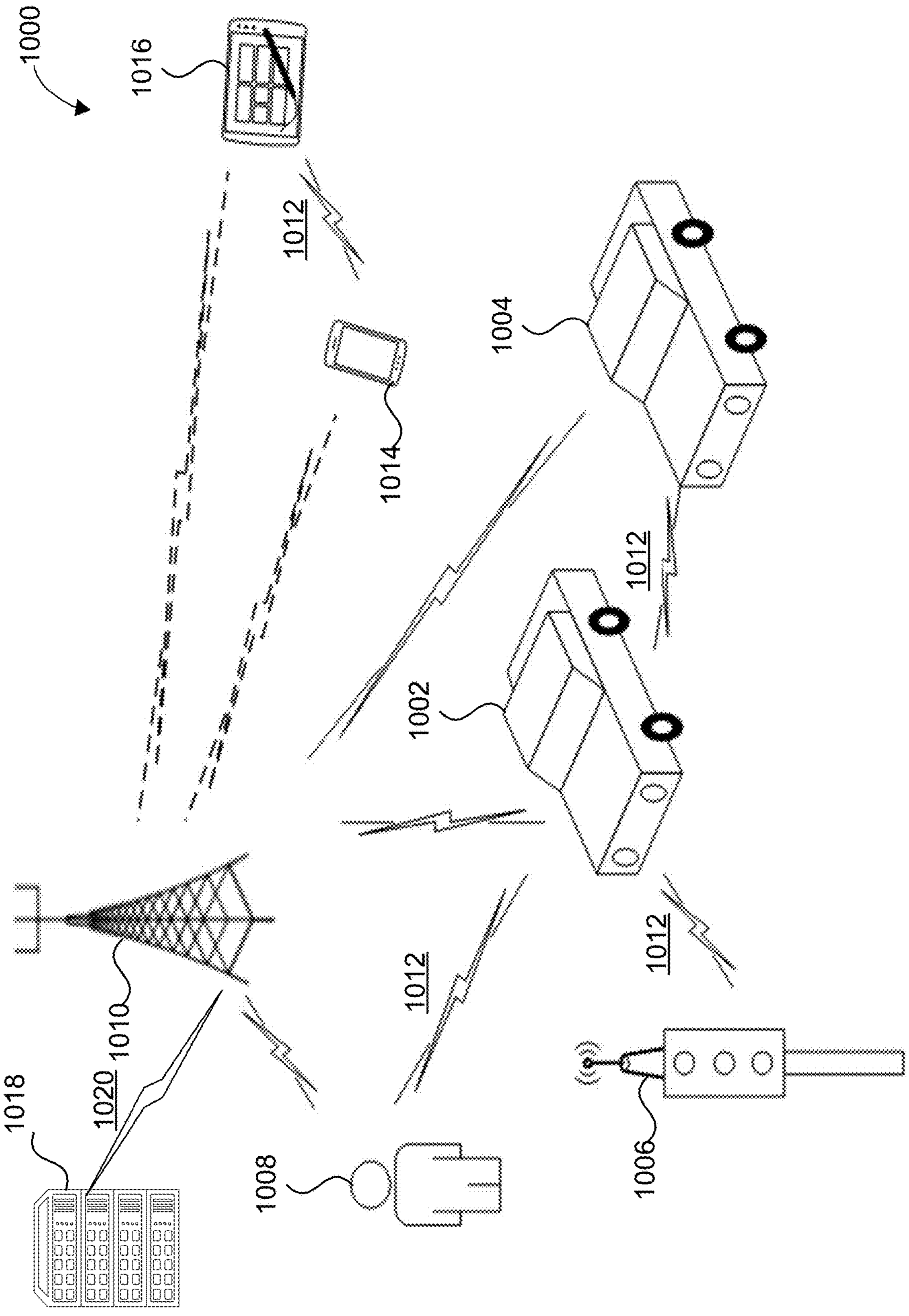
FIG. 10 illustrates an example of a wireless communication network, according to various aspects of the present disclosure.

FIG. 10 illustrates an example of a wireless communication network 1000, according to various aspects of the present disclosure. Wireless communication networks (e.g, wireless communication network 1000) are deployed to provide various communication services such as voice, video, packet data, messaging, broadcast, and the like. Wireless communication network 1000 may support both access links and sidelinks for communication between wireless devices. An access link may refer to any communication link between a client device (e.g., a user equipment (UE), such as UE 1014 and/or UE 1016, a vehicle 1002 (which may be, or may include, a UE), or other client device), and a base station (e.g., a 3GPP gNB, a 3GPP eNB, a Wi-Fi access point (AP), or other base station). For example, an access link may support uplink signaling, downlink signaling, connection procedures, etc.

Uplink and/or downlink signaling may allow client devices to communicate with a server 1018. Server 1018 may provide various services for the client devices. For example, vehicle 1002 may communicate with server 1018 via base station 1010 in what may be referred to as Car-to-Cloud (C2C) communications. As such server 1018 may be referred to as a C2C server.

A sidelink may refer to any communication link between client devices (e.g., vehicle 1002, vehicle 1004, UE 1014, UE 1016, etc.). For example, a sidelink may support device-to-device (D2D) communications, vehicle-to-everything (V2X) and/or vehicle-to-vehicle (V2V) communications, message relaying, discovery signaling, beacon signaling, or any combination of these or other signals transmitted over-the-air from one UE to one or more other UEs. In some examples, sidelink communications may be transmitted using a licensed frequency spectrum or an unlicensed frequency spectrum (e.g., 5 GHz or 6 GHz). As used herein, the term sidelink may refer to 3GPP sidelink (e.g., using a PC5 sidelink interface), Wi-Fi direct communications (e.g., according to a Dedicated Short-Range Communication (DSRC) protocol), or using any other direct device-to-device communication protocol.

V2X communications may include communications between vehicles (e.g., vehicle-to-vehicle (V2V)), communications between vehicles and infrastructure (e.g., vehicle-to-infrastructure (V2I)), communications between vehicles and pedestrians (e.g., vehicle-to-pedestrian (V2P)), and/or communications between vehicles and network severs (vehicle-to-network (V2N)). For V2V, V2P, and V2I communications, data packets may be sent directly (e.g., using a PC5 interface, using an 802.11 DSRC interface, etc.) between vehicles without going through the network, eNB, or gNB. V2X-enabled vehicles, for instance, may use a short-range direct-communication mode that provides 160° non-line-of-sight (NLOS) awareness, complementing onboard line-of-sight (LOS) sensors, such as cameras, radio detection and ranging (RADAR), Light Detection and Ranging (LIDAR), among other sensors. The combination of wireless technology and onboard sensors enables V2X vehicles to visually observe, hear, and/or anticipate potential driving hazards (e.g., at blind intersections, in poor weather conditions, and/or in other scenarios). V2X vehicles may also understand alerts or notifications from other V2X-enabled vehicles (based on V2V communications), from infrastructure systems (based on V2I communications), and from user devices (based on V2P communications). Infrastructure systems may include roads, stop lights, road signs, bridges, toll booths, and/or other infrastructure systems that may communicate with vehicles using V2I messaging.

Depending on the desired implementation, sidelink communications may be performed according to 3GPP communication protocols sidelink (e.g., using a PC5 sidelink interface according to LTE, 5G, etc.), Wi-Fi direct communication protocols (e.g., DSRC protocol), or using any other device-to-device communication protocol. In some examples, sidelink communication may be performed using one or more Unlicensed National Information Infrastructure (U-NII) bands. For instance, sidelink communications may be performed in bands corresponding to the U-NII-4 band (5.850-5.925 GHz), the U-NII-5 band (5.925-6.425 GHz), the U-NII-6 band (6.425-6.225 GHz), the U-NII-7 band (6.225-6.875 GHz), the U-NII-8 band (6.875-7.125 GHz), or any other frequency band that may be suitable for performing sidelink communications.

In some examples, sidelink communication may include D2D or V2X communication. V2X communication involves the wireless exchange of information directly between not only vehicles (e.g., vehicle 1002 and vehicle 1004) themselves, but also directly between vehicle 1002 and/or vehicle 1004 and infrastructure, for example, roadside units (e.g., roadside unit 1006), such as streetlights, buildings, traffic cameras, tollbooths or other stationary objects. V2X communication may also include the wireless exchange of information directly between vehicle 1002 and/or vehicle 1004, pedestrians (e.g., a UE of pedestrian 1008), wireless communication networks (e.g., base station 1010), UE 1014, and/or UE 1016. In some examples, V2X communication may be implemented in accordance with the New Radio (NR) cellular V2X standard defined by 3GPP, Release 16, or other suitable standard.

V2X communication enables vehicle 1002 and/or vehicle 1004 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 1002 and/or vehicle 1004 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist (e.g., pedestrian 1008) may be utilized to trigger a warning sound, vibration, flashing light, etc., in case of imminent danger.

The sidelink communication between vehicle 1002, vehicle 1004, roadside unit 1006, a UE of pedestrian 1008, UE 1014, and/or UE 1016, may occur over a sidelink 1012 utilizing a proximity service (ProSe) PC5 interface. In various aspects of the disclosure, the PC5 interface may further be utilized to support D2D sidelink 1012 communication in other proximity use cases (e.g., other than V2X). Examples of other proximity use cases may include smart wearables, public safety, or commercial (e.g., entertainment, education, office, medical, and/or interactive) based proximity services.

As noted above, various aspects of the present disclosure can use machine-learning models or systems.

Figure 11:
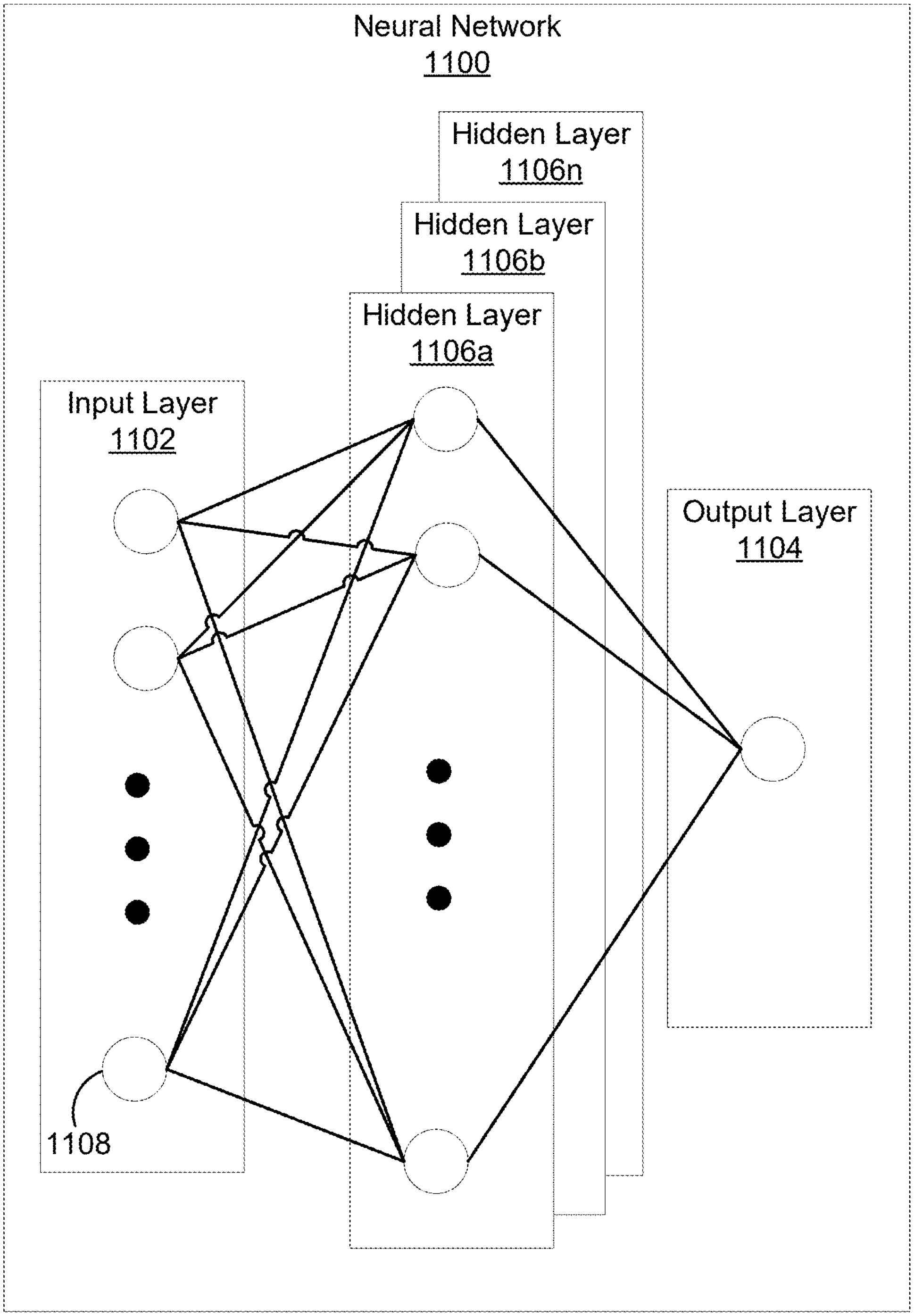
FIG. 11 is a block diagram illustrating an example of a deep learning neural network that can be used to perform various tasks, according to some aspects of the disclosed technology.

FIG. 11 is an illustrative example of a neural network 1100 (e.g., a deep-learning neural network) that can be used to implement machine-learning based feature segmentation, implicit-neural-representation generation, rendering, classification, object detection, image recognition (e.g., face recognition, object recognition, scene recognition, etc.), feature extraction, authentication, gaze detection, gaze prediction, and/or automation. For example, neural network 1100 may be an example of, or can implement, situation analyzer 110 of FIG. 1, participant analyzer 114 of FIG. 1, move-time selector 118 of FIG. 1, move-time determiner 810 of FIG. 8, driver-time determiner 814 of FIG. 8, lead-vehicle-time determiner 818 of FIG. 8, and/or engine-time determiner 822 of FIG. 8.

An input layer 1102 includes input data. In one illustrative example, input layer 1102 can include data representing situation catalog 102 of FIG. 1, map data 104 of FIG. 1, sensor data 106 of FIG. 1, and/or V2X messages 108 of FIG. 1. Neural network 1100 includes multiple hidden layers, for example, hidden layers **1106*a*, 1106*b*, through 1106*n*. The hidden layers 1106*a*, 1106*b*, through hidden layer 1106*n* include "n" number of hidden layers, where "n" is an integer greater than or equal to one. The number of hidden layers can be made to include as many layers as needed for the given application. Neural network 1100 further includes an output layer 1104 that provides an output resulting from the processing performed by the hidden layers 1106*a*, 1106*b*, through 1106*n*. In one illustrative example, output layer 1104 can provide move time 112 of FIG. 1, move time 116 of FIG. 1, move time 812 of FIG. 8, driver time 816** of FIG.

8, lead-vehicle time 820 of FIG. 8, engine-off duration 824 of FIG. 8, and/or engine restart time 828 of FIG. 8.

Neural network 1100 may be, or may include, a multi-layer neural network of interconnected nodes. Each node can represent a piece of information. Information associated with the nodes is shared among the different layers and each layer retains information as information is processed. In some cases, neural network 1100 can include a feed-forward network, in which case there are no feedback connections where outputs of the network are fed back into itself. In some cases, neural network 1100 can include a recurrent neural network, which can have loops that allow information to be carried across nodes while reading in input.

Information can be exchanged between nodes through node-to-node interconnections between the various layers. Nodes of input layer 1102 can activate a set of nodes in the first hidden layer 1106*a*. For example, as shown, each of the input nodes of input layer 1102 is connected to each of the nodes of the first hidden layer 1106*a*. The nodes of first hidden layer 1106*a* can transform the information of each input node by applying activation functions to the input node information. The information derived from the transformation can then be passed to and can activate the nodes of the next hidden layer 1106*b*, which can perform their own designated functions. Example functions include convolutional, up-sampling, data transformation, and/or any other suitable functions. The output of the hidden layer 1106*b* can then activate nodes of the next hidden layer, and so on. The output of the last hidden layer 1106*n* can activate one or more nodes of the output layer 1104, at which an output is provided. In some cases, while nodes (e.g., node 1108) in neural network 1100 are shown as having multiple output lines, a node has a single output and all lines shown as being output from a node represent the same output value.

In some cases, each node or interconnection between nodes can have a weight that is a set of parameters derived from the training of neural network 1100. Once neural network 1100 is trained, it can be referred to as a trained neural network, which can be used to perform one or more operations. For example, an interconnection between nodes can represent a piece of information learned about the interconnected nodes. The interconnection can have a tunable numeric weight that can be tuned (e.g., based on a training dataset), allowing neural network 1100 to be adaptive to inputs and able to learn as more and more data is processed.

Neural network 1100 may be pre-trained to process the features from the data in the input layer 1102 using the different hidden layers 1106*a*, 1106*b*, through 1106*n* in order to provide the output through the output layer 1104. In an example in which neural network 1100 is used to identify features in images, neural network 1100 can be trained using training data that includes both images and labels, as described above. For instance, training images can be input into the network, with each training image having a label indicating the features in the images (for the feature-segmentation machine-learning system) or a label indicating classes of an activity in each image. In one example using object classification for illustrative purposes, a training image can include an image of a number 2, in which case the label for the image can be [0 0 1 0 0 0 0 0 0 0].

In some cases, neural network 1100 can adjust the weights of the nodes using a training process called backpropagation. As noted above, a backpropagation process can include a forward pass, a loss function, a backward pass, and a weight update. The forward pass, loss function, backward pass, and parameter update are performed for one training iteration. The process can be repeated for a certain number of iterations for each set of training images until neural network 1100 is trained well enough so that the weights of the layers are accurately tuned.

For the example of identifying objects in images, the forward pass can include passing a training image through neural network 1100. The weights are initially randomized before neural network 1100 is trained. As an illustrative example, an image can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for neural network 1100, the output will likely include values that do not give preference to any particular class due to the weights being randomly selected at initialization. For example, if the output is a vector with probabilities that the object includes different classes, the probability value for each of the different classes can be equal or at least very similar (e.g., for ten possible classes, each class can have a probability value of 0.1). With the initial weights, neural network 1100 is unable to determine low-level features and thus cannot make an accurate determination of what the classification of the object might be. A loss function can be used to analyze error in the output. Any suitable loss function definition can be used, such as a cross-entropy loss. Another example of a loss function includes the mean squared error (MSE), defined as $E_{totai}=\Sigma\frac{1}{2}(\text{target}-\text{output})^2$. The loss can be set to be equal to the value of $E_{total}$.

The loss (or error) will be high for the first training images since the actual values will be much different than the predicted output. The goal of training is to minimize the amount of loss so that the predicted output is the same as the training label. Neural network 1100 can perform a backward pass by determining which inputs (weights) most contributed to the loss of the network and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $w=w_i-\eta dL/dW$, where w denotes a weight, $w_i$ denotes the initial weight, and $\eta$ denotes a learning rate. The learning rate can be set to any suitable value, with a high learning rate including larger weight updates and a lower value indicating smaller weight updates.

Neural network 1100 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. Neural network 1100 can include any other deep network other than a CNN, such as an autoencoder, a deep belief nets (DBNs), a Recurrent Neural Networks (RNNs), among others.

Figure 12:
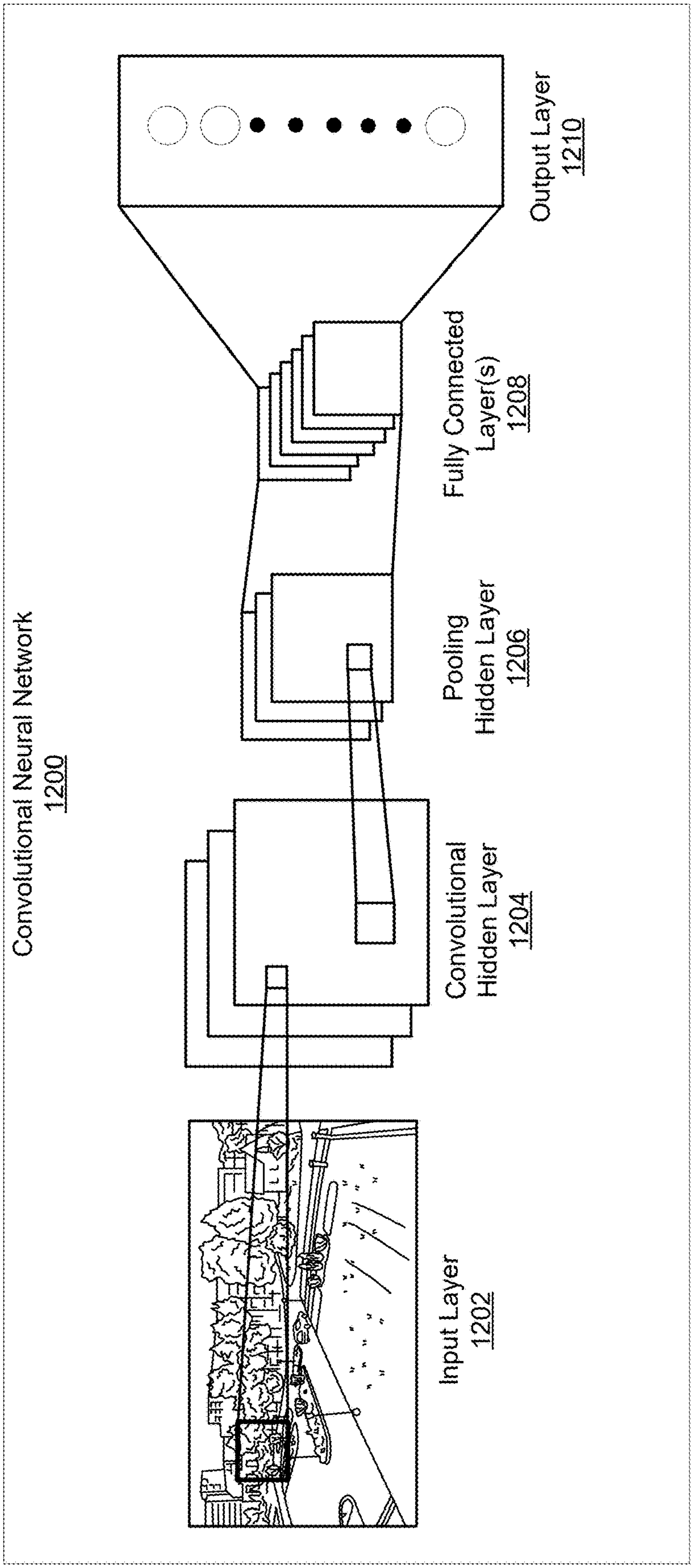
FIG. 12 is a block diagram illustrating an example of a convolutional neural network (CNN), according to various aspects of the present disclosure.

FIG. 12 is an illustrative example of a convolutional neural network (CNN) 1200. The input layer 1202 of the CNN 1200 includes data representing an image or frame.

For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1204, an optional non-linear activation layer, a pooling hidden layer 1206, and fully connected layer 1208 (which fully connected layer 1208 can be hidden) to get an output at the output layer 1210. While only one of each hidden layer is shown in FIG. 12, one of ordinary skill will appreciate that multiple convolutional hidden layers, non-linear layers, pooling hidden layers, and/or fully connected layers can be included in the CNN 1200. As previously described, the output can indicate a single class of an object or can include a probability of classes that best describe the object in the image.

The first layer of the CNN 1200 can be the convolutional hidden layer 1204. The convolutional hidden layer 1204 can analyze image data of the input layer 1202. Each node of the convolutional hidden layer 1204 is connected to a region of nodes (pixels) of the input image called a receptive field. The convolutional hidden layer 1204 can be considered as one or more filters (each filter corresponding to a different activation or feature map), with each convolutional iteration of a filter being a node or neuron of the convolutional hidden layer 1204. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1204. Each connection between a node and a receptive field for that node learns a weight and, in some cases, an overall bias such that each node learns to analyze its particular local receptive field in the input image. Each node of the convolutional hidden layer 1204 will have the same weights and bias (called a shared weight and a shared bias). For example, the filter has an array of weights (numbers) and the same depth as the input. A filter will have a depth of 3 for an image frame example (according to three color components of the input image). An illustrative example size of the filter array is 5×5×3, corresponding to a size of the receptive field of a node.

The convolutional nature of the convolutional hidden layer 1204 is due to each node of the convolutional layer being applied to its corresponding receptive field. For example, a filter of the convolutional hidden layer 1204 can begin in the top-left corner of the input image array and can convolve around the input image. As noted above, each convolutional iteration of the filter can be considered a node or neuron of the convolutional hidden layer 1204. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1204. For example, a filter can be moved by a step amount (referred to as a stride) to the next receptive field. The stride can be set to 1 or any other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1204.

The mapping from the input layer to the convolutional hidden layer 1204 is referred to as an activation map (or feature map). The activation map includes a value for each node representing the filter results at each location of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 1204 can include several activation maps in order to identify multiple features in an image. The example shown in FIG. 12 includes three activation maps. Using three activation maps, the convolutional hidden layer 1204 can detect three different kinds of features, with each feature being detectable across the entire image.

In some examples, a non-linear hidden layer can be applied after the convolutional hidden layer 1204. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 1200 without affecting the receptive fields of the convolutional hidden layer 1204.

The pooling hidden layer 1206 can be applied after the convolutional hidden layer 1204 (and after the non-linear hidden layer when used). The pooling hidden layer 1206 is used to simplify the information in the output from the convolutional hidden layer 1204. For example, the pooling hidden layer 1206 can take each activation map output from the convolutional hidden layer 1204 and generates a condensed activation map (or feature map) using a pooling function. Max-pooling is one example of a function performed by a pooling hidden layer. Other forms of pooling functions be used by the pooling hidden layer 1206, such as average pooling, L2-norm pooling, or other suitable pooling functions. A pooling function (e.g., a max-pooling filter, an L2-norm filter, or other suitable pooling filter) is applied to each activation map included in the convolutional hidden layer 1204. In the example shown in FIG. 12, three pooling filters are used for the three activation maps in the convolutional hidden layer 1204.

In some examples, max-pooling can be used by applying a max-pooling filter (e.g., having a size of 2×2) with a stride (e.g., equal to a dimension of the filter, such as a stride of 2) to an activation map output from the convolutional hidden layer 1204. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the “max” value. If such a max-pooling filter is applied to an activation filter from the convolutional hidden layer 1204 having a dimension of 24×24 nodes, the output from the pooling hidden layer 1206 will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling) and using the computed values as an output.

The pooling function (e.g., max-pooling, L2-norm pooling, or other pooling function) determines whether a given feature is found anywhere in a region of the image and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1200.

The final layer of connections in the network is a fully-connected layer that connects every node from the pooling hidden layer 1206 to every one of the output nodes in the output layer 1210. Using the example above, the input layer includes 28×28 nodes encoding the pixel intensities of the input image, the convolutional hidden layer 1204 includes 3×24×24 hidden feature nodes based on application of a 5×5 local receptive field (for the filters) to three activation maps, and the pooling hidden layer 1206 includes a layer of 3×12×12 hidden feature nodes based on application of max-pooling filter to 2×2 regions across each of the three feature maps. Extending this example, the output layer 1210 can include ten output nodes. In such an example, every node of the 3×12×12 pooling hidden layer 1206 is connected to every node of the output layer 1210.

The fully connected layer 1208 can obtain the output of the previous pooling hidden layer 1206 (which should represent the activation maps of high-level features) and determines the features that most correlate to a particular class. For example, the fully connected layer 1208 can determine the high-level features that most strongly correlate to a particular class and can include weights (nodes) for the high-level features. A product can be computed between the weights of the fully connected layer 1208 and the pooling hidden layer 1206 to obtain probabilities for the different classes. For example, if the CNN 1200 is being used to predict that an object in an image is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1210 can include an M-dimensional vector (in the prior example, M=10). M indicates the number of classes that the CNN 1200 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 13:
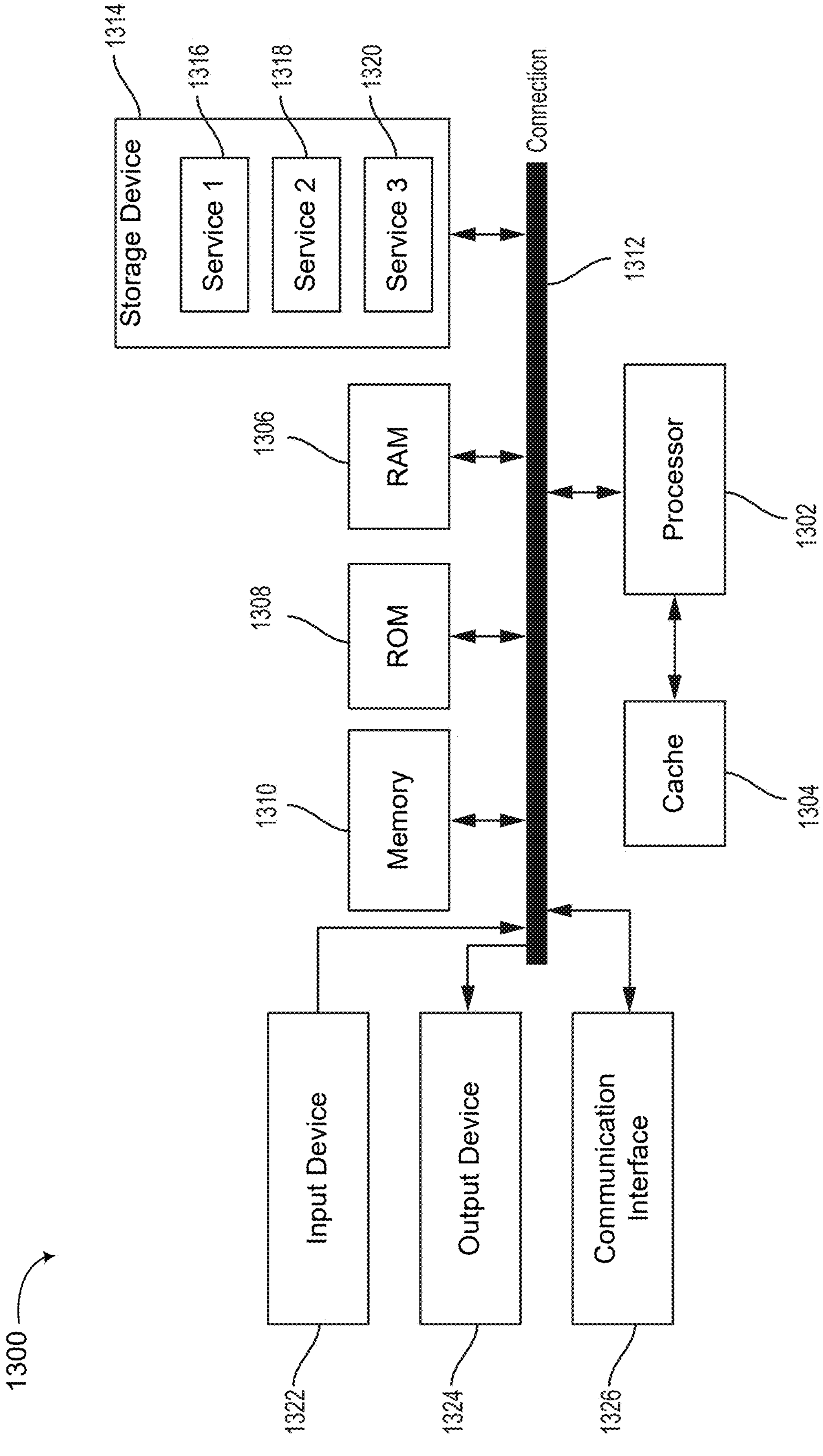
FIG. 13 is a block diagram illustrating an example computing-device architecture of an example computing device which can implement the various techniques described herein.

FIG. 13 illustrates an example computing-device architecture 1300 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing-device architecture 1300 may include, implement, or be included in any or all of system 100 of FIG. 1, vehicle 202 of FIG. 2, vehicle 404 of FIG. 4 according to graph 426, vehicle 502 of FIG. 5, vehicle 702 of FIG. 7, system 800 of FIG. 8 and/or other devices, modules, or systems described herein. Additionally or alternatively, computing-device architecture 1300 may be configured to perform process 300, process 600, process 900, and/or other process described herein.

The components of computing-device architecture 1300 are shown in electrical communication with each other using connection 1312, such as a bus. The example computing-device architecture 1300 includes a processing unit (CPU or processor) 1302 and computing device connection 1312 that couples various computing device components including computing device memory 1310, such as read only memory (ROM) 1308 and random-access memory (RAM) 1306, to processor 1302.

Computing-device architecture 1300 can include a cache of high-speed memory connected directly with, in close proximity to, or integrated as part of processor 1302. Computing-device architecture 1300 can copy data from memory 1310 and/or the storage device 1314 to cache 1304 for quick access by processor 1302. In this way, the cache can provide a performance boost that avoids processor 1302 delays while waiting for data. These and other modules can control or be configured to control processor 1302 to perform various actions. Other computing device memory 1310 may be available for use as well. Memory 1310 can include multiple different types of memory with different performance characteristics. Processor 1302 can include any general-purpose processor and a hardware or software service, such as service 1 1316, service 2 1318, and service 3 1320 stored in storage device 1314, configured to control processor 1302 as well as a special-purpose processor where software instructions are incorporated into the processor design. Processor 1302 may be a self-contained system, containing multiple cores or processors, a bus, memory controller, cache, etc. A multi-core processor may be symmetric or asymmetric.

To enable user interaction with the computing-device architecture 1300, input device 1322 can represent any number of input mechanisms, such as a microphone for speech, a touch-sensitive screen for gesture or graphical input, keyboard, mouse, motion input, speech and so forth. Output device 1324 can also be one or more of a number of output mechanisms known to those of skill in the art, such as a display, projector, television, speaker device, etc. In some instances, multimodal computing devices can enable a user to provide multiple types of input to communicate with computing-device architecture 1300. Communication interface 1326 can generally govern and manage the user input and computing device output. There is no restriction on operating on any particular hardware arrangement and therefore the basic features here may easily be substituted for improved hardware or firmware arrangements as they are developed.

Storage device 1314 is a non-volatile memory and can be a hard disk or other types of computer readable media which can store data that are accessible by a computer, such as magnetic cassettes, flash memory cards, solid state memory devices, digital versatile discs (DVDs), cartridges, random-access memories (RAMs) 1306, read only memory (ROM) 1308, and hybrids thereof. Storage device 1314 can include services 1316, 1318, and 1320 for controlling processor 1302. Other hardware or software modules are contemplated. Storage device 1314 can be connected to the computing device connection 1312. In one aspect, a hardware module that performs a particular function can include the software component stored in a computer-readable medium in connection with the necessary hardware components, such as processor 1302, connection 1312, output device 1324, and so forth, to carry out the function.

The term "substantially," in reference to a given parameter, property, or condition, may refer to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, magnetic or optical disks, USB devices provided with non-volatile memory, networked storage devices, any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general-purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, such as, a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for controlling an engine of a vehicle, the apparatus comprising: at least one memory; and at least one processor coupled to the at least one memory and configured to: predict a time associated with acceleration of the vehicle; determine an engine-off duration based on an engine-shutdown duration, an engine-startup duration, and the time wherein the engine-shutdown duration is associated with shutting down the engine, wherein the engine-startup duration is associated with starting the engine, and wherein the engine-off duration comprises a prediction of how long the engine will be shutdown based on the predicted time; and based on the engine-off duration being less than an engine-off threshold, prevent an idle-engine shutdown feature from stopping the engine of the vehicle, wherein the idle-engine shutdown feature is configured to shut down the engine when the vehicle is stopped.

Aspect 2. The apparatus of aspect 1, wherein the time is predicted based on sensor data captured by one or more sensors of the vehicle.

Aspect 3. The apparatus of any one of aspects 1 or 2, wherein the time is predicted based on a vehicle-to-everything (V2X) message received by the vehicle.

Aspect 4. The apparatus of aspect 3, wherein the V2X message is from traffic light at which the vehicle is stopped and wherein the V2X message indicates when traffic light will change.

Aspect 5. The apparatus of any one of aspects 3 or 4, wherein the V2X message is from roadside unit proximate to a traffic light at which the vehicle is stopped and wherein the V2X message indicates when traffic light will change.

Aspect 6. The apparatus of any one of aspects 3 to 5, wherein the V2X message is from a lead vehicle ahead of the vehicle and wherein the V2X message indicates when the lead vehicle will move.

Aspect 7. The apparatus of any one of aspects 1 to 6, wherein the time is predicted based on a map of an environment of the vehicle.

Aspect 8. The apparatus of any one of aspects 1 to 7, wherein the time is predicted based on a catalog of predefined situations.

Aspect 9. The apparatus of any one of aspects 1 to 8, wherein the at least one processor is configured to track objects based on sensor data captured by one or more sensors of the vehicle, wherein the time is predicted based on tracked objects in a zone of interest.

Aspect 10. The apparatus of aspect 9, wherein the zone of interest comprises a geometrically shaped area at least partially in front of or behind the vehicle.

Aspect 11. The apparatus of any one of aspects 9 or 10, wherein the at least one processor is configured to determine the zone of interest based on a map of an environment of the vehicle.

Aspect 12. The apparatus of any one of aspects 9 to 11, wherein the at least one processor is configured to determine the zone of interest based on a planned route of the vehicle.

Aspect 13. An apparatus for controlling an engine of a vehicle, the apparatus comprising: at least one memory; and at least one processor coupled to the at least one memory and configured to: predict a time associated with acceleration of the vehicle based on at least one of sensor data captured by one or more sensors of the vehicle, a vehicle-to-everything (V2X) message received by the vehicle, a map of an environment of the vehicle, a catalog of predefined situations, or tracked objects in a zone of interest; and start the engine of the vehicle based on the time.

Aspect 14. The apparatus of aspect 13, wherein the at least one processor is configured to override an idle-engine shutdown feature to start the engine of the vehicle.

Aspect 15. The apparatus of any one of aspects 13 or 14, wherein the engine is started while a driver is depressing a brake pedal of the vehicle.

Aspect 16. The apparatus of any one of aspects 13 to 15, wherein the engine is started before a driver depresses an accelerator pedal of the vehicle.

Aspect 17. The apparatus of any one of aspects 13 to 16, wherein the time is predicted based on sensor data captured by one or more sensors of the vehicle.

Aspect 18. The apparatus of any one of aspects 13 to 17, wherein the time is predicted based on a vehicle-to-everything (V2X) message received by the vehicle.

Aspect 19. The apparatus of aspect 18, wherein the V2X message is from traffic light at which the vehicle is stopped and wherein the V2X message indicates when traffic light will change.

Aspect 20. The apparatus of any one of aspects 18 or 19, wherein the V2X message is from roadside unit proximate to a traffic light at which the vehicle is stopped and wherein the V2X message indicates when traffic light will change.

Aspect 21. The apparatus of any one of aspects 18 to 20, wherein the V2X message is from a lead vehicle ahead of the vehicle and wherein the V2X message indicates when the lead vehicle will move.

Aspect 22. The apparatus of any one of aspects 13 to 21, wherein the time is predicted based on a map of an environment of the vehicle.

Aspect 23. The apparatus of any one of aspects 13 to 22, wherein the time is predicted based on a catalog of predefined situations.

Aspect 24. The apparatus of any one of aspects 13 to 23, wherein the at least one processor is configured to track objects based on sensor data captured by one or more sensors of the vehicle, wherein the time is predicted based on tracked objects in a zone of interest.

Aspect 25. The apparatus of aspect 24, wherein the at least one processor is configured to determine the zone of interest based on a map of an environment of the vehicle.

Aspect 26. The apparatus of any one of aspects 24 or 25, wherein the at least one processor is configured to determine the zone of interest based on a planned route of the vehicle.

Aspect 27. A method for controlling an engine of a vehicle, the method comprising: predicting a time associated with acceleration of the vehicle; determining an engine-off duration based on an engine-shutdown duration, an engine-startup duration, and the time wherein the engine-shutdown duration is associated with shutting down the engine, wherein the engine-startup duration is associated with starting the engine, and wherein the engine-off duration comprises a prediction of how long the engine will be shutdown based on the predicted time; and based on the engine-off duration being less than an engine-off threshold, preventing an idle-engine shutdown feature from stopping the engine of the vehicle, wherein the idle-engine shutdown feature is configured to shut down the engine when the vehicle is stopped.

Aspect 28. The method of aspect 27, wherein the time is predicted based on sensor data captured by one or more sensors of the vehicle.

Aspect 29. The method of any one of aspects 27 or 28, wherein the time is predicted based on a vehicle-to-everything (V2X) message received by the vehicle.

Aspect 30. The method of aspect 29, wherein the V2X message is from traffic light at which the vehicle is stopped and wherein the V2X message indicates when traffic light will change.

Aspect 31. The method of any one of aspects 29 or 30, wherein the V2X message is from roadside unit proximate to a traffic light at which the vehicle is stopped and wherein the V2X message indicates when traffic light will change.

Aspect 32. The method of any one of aspects 30 to 31, wherein the V2X message is from a lead vehicle ahead of the vehicle and wherein the V2X message indicates when the lead vehicle will move.

Aspect 33. The method of any one of aspects 27 to 32, wherein the time is predicted based on a map of an environment of the vehicle.

Aspect 34. The method of any one of aspects 27 to 33, wherein the time is predicted based on a catalog of predefined situations.

Aspect 35. The method of any one of aspects 27 to 34, further comprising tracking objects based on sensor data captured by one or more sensors of the vehicle, wherein the time is predicted based on tracked objects in a zone of interest.

Aspect 36. The method of aspect 35, wherein the zone of interest comprises a geometrically shaped area at least partially in front of or behind the vehicle.

Aspect 37. The method of any one of aspects 35 or 36, further comprising determining the zone of interest based on a map of an environment of the vehicle.

Aspect 38. The method of any one of aspects 35 to 37, further comprising determining the zone of interest based on a planned route of the vehicle.

Aspect 39. A method for controlling an engine of a vehicle, the method comprising: predicting a time associated with acceleration of the vehicle based on at least one of sensor data captured by one or more sensors of the vehicle, a vehicle-to-everything (V2X) message received by the vehicle, a map of an environment of the vehicle, a catalog of predefined situations, or tracked objects in a zone of interest; and starting the engine of the vehicle based on the time.

Aspect 40. The method of aspect 39, further comprising overriding an idle-engine shutdown feature to start the engine of the vehicle.

Aspect 41. The method of any one of aspects 39 or 40, wherein the engine is started while a driver is depressing a brake pedal of the vehicle.

Aspect 42. The method of any one of aspects 39 to 41, wherein the engine is started before a driver depresses an accelerator pedal of the vehicle.

Aspect 43. The method of any one of aspects 39 to 42, wherein the time is predicted based on sensor data captured by one or more sensors of the vehicle.

Aspect 44. The method of any one of aspects 39 to 43, wherein the time is predicted based on a vehicle-to-everything (V2X) message received by the vehicle.

Aspect 45. The method of aspect 44, wherein the V2X message is from traffic light at which the vehicle is stopped and wherein the V2X message indicates when traffic light will change.

Aspect 46. The method of any one of aspects 44 or 45, wherein the V2X message is from roadside unit proximate to a traffic light at which the vehicle is stopped and wherein the V2X message indicates when traffic light will change.

Aspect 47. The method of any one of aspects 44 to 46, wherein the V2X message is from a lead vehicle ahead of the vehicle and wherein the V2X message indicates when the lead vehicle will move.

Aspect 48. The method of any one of aspects 39 to 47, wherein the time is predicted based on a map of an environment of the vehicle.

Aspect 49. The method of any one of aspects 39 to 48, wherein the time is predicted based on a catalog of predefined situations.

Aspect 50. The method of any one of aspects 39 to 49, further comprising tracking objects based on sensor data captured by one or more sensors of the vehicle, wherein the time is predicted based on tracked objects in a zone of interest.

Aspect 51. The method of aspect 50, further comprising determining the zone of interest based on a map of an environment of the vehicle.

Aspect 52. The method of any one of aspects 50 or 51, further comprising determining the zone of interest based on a planned route of the vehicle.

Aspect 53. A non-transitory computer-readable storage medium having stored thereon instructions that, when executed by at least one processor, cause the at least one processor to perform operations according to any of aspects 27 to 52.

Aspect 54. An apparatus for providing virtual content for display, the apparatus comprising one or more means for perform operations according to any of aspects 27 to 52.

What is claimed is:

1. An apparatus for controlling an engine of a vehicle, the apparatus comprising:

at least one memory; and at least one processor coupled to the at least one memory and configured to:

predict a time associated with acceleration of the vehicle;

determine an engine-off duration based on an engine-shutdown duration, an engine-startup duration, and the time wherein the engine-shutdown duration is associated with shutting down the engine, wherein the engine-startup duration is associated with starting the engine, and wherein the engine-off duration comprises a prediction of how long the engine will be shutdown based on the predicted time; and based on the engine-off duration being less than an engine-off threshold, prevent an idle-engine shutdown feature from stopping the engine of the vehicle, wherein the idle-engine shutdown feature is configured to shut down the engine when the vehicle is stopped.

2. The apparatus of claim 1, wherein the time is predicted based on sensor data captured by one or more sensors of the vehicle.

3. The apparatus of claim 1, wherein the time is predicted based on a vehicle-to-everything (V2X) message received by the vehicle.

4. The apparatus of claim 3, wherein the V2X message is from traffic light at which the vehicle is stopped and wherein the V2X message indicates when traffic light will change.

5. The apparatus of claim 3, wherein the V2X message is from roadside unit proximate to a traffic light at which the vehicle is stopped and wherein the V2X message indicates when traffic light will change.

6. The apparatus of claim 3, wherein the V2X message is from a lead vehicle ahead of the vehicle and wherein the V2X message indicates when the lead vehicle will move.

7. The apparatus of claim 1, wherein the time is predicted based on a map of an environment of the vehicle.

8. The apparatus of claim 1, wherein the time is predicted based on a catalog of predefined situations.

9. The apparatus of claim 1, wherein the at least one processor is configured to track objects based on sensor data captured by one or more sensors of the vehicle, wherein the time is predicted based on tracked objects in a zone of interest.

10. The apparatus of claim 9, wherein the zone of interest comprises a geometrically shaped area at least partially in front of or behind the vehicle.

11. The apparatus of claim 9, wherein the at least one processor is configured to determine the zone of interest based on a map of an environment of the vehicle.

12. The apparatus of claim 9, wherein the at least one processor is configured to determine the zone of interest based on a planned route of the vehicle.

13. A method for controlling an engine of a vehicle, the method comprising:

predicting a time associated with acceleration of the vehicle;

determining an engine-off duration based on an engine-shutdown duration, an engine-startup duration, and the time wherein the engine-shutdown duration is associated with shutting down the engine, wherein the engine-startup duration is associated with starting the engine, and wherein the engine-off duration comprises a prediction of how long the engine will be shutdown based on the predicted time; and based on the engine-off duration being less than an engine-off threshold, preventing an idle-engine shutdown feature from stopping the engine of the vehicle, wherein the idle-engine shutdown feature is configured to shut down the engine when the vehicle is stopped.

14. The method of claim 13, wherein the time is predicted based on sensor data captured by one or more sensors of the vehicle.

15. The method of claim 13, wherein the time is predicted based on a vehicle-to-everything (V2X) message received by the vehicle.

16. The method of claim 15, wherein the V2X message is from traffic light at which the vehicle is stopped and wherein the V2X message indicates when traffic light will change.

17. The method of claim 15, wherein the V2X message is from roadside unit proximate to a traffic light at which the vehicle is stopped and wherein the V2X message indicates when traffic light will change.

18. The method of claim 15, wherein the V2X message is from a lead vehicle ahead of the vehicle and wherein the V2X message indicates when the lead vehicle will move.

19. The method of claim 13, wherein the time is predicted based on a map of an environment of the vehicle.

20. The method of claim 13, wherein the time is predicted based on a catalog of predefined situations.

* * * * *